US012742382B2

(12) United States Patent
Evans et al.

(10) Patent No.: US 12,742,382 B2
(45) Date of Patent: Sep. 22, 2026

(54) DOWNHOLE SENSOR APPARATUS, SYSTEM, AND RELATED METHODS

(71) Applicant: Baker Hughes Oilfield Operations LLC, Houston, TX (US)

(72) Inventors: Kenneth R. Evans, Spring, TX (US); Jeremy Todd Townsend, The Woodlands, TX (US); Cecil Schandorf, Cypress, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/664,833

(22) Filed: May 24, 2022

(65) Prior Publication Data

US 2023/0399939 A1 Dec. 14, 2023

(51) Int. Cl.
*E21B 47/06* (2012.01)
*E21B 47/013* (2012.01)
(Continued)

(52) U.S. Cl.
CPC ............ *E21B 47/06* (2013.01); *E21B 47/013* (2020.05); *E21B 47/017* (2020.05); *G01L 7/022* (2013.01); *G01L 7/082* (2013.01); *G01L 19/147* (2013.01)

(58) Field of Classification Search
CPC ...... E21B 47/06; E21B 47/047; E21B 47/013; G01L 7/022; G01L 7/082; G01L 19/147
See application file for complete search history.

(56) References Cited

U.S. PATENT DOCUMENTS 4,958,517 A * 9/1990 Maron .................. E21B 47/007 73/152.59
7,364,007 B2 * 4/2008 Garcia-Osuna ......... E21B 47/01 166/255.2

(Continued)

FOREIGN PATENT DOCUMENTS

WO 2015/147788 A1 3/2014
WO 2017/037432 A1 3/2017

OTHER PUBLICATIONS

International Search Report for International Application No. PCT/US2023/066887 dated Sep. 12, 2023, 4 pages.

(Continued)

*Primary Examiner* — Jill E Culler
(74) *Attorney, Agent, or Firm* — TraskBritt

(57) ABSTRACT

A downhole sensor apparatus may include a first surface at a first end of the downhole sensor apparatus, a sensor coupled to the downhole sensor apparatus, and an exterior surface at a second, opposite end of the downhole sensor apparatus. The downhole sensor apparatus is configured to be inserted into a recess of a drill string component such that the first surface is adjacent an interior surface within the recess. The exterior surface of the downhole sensor apparatus is configured to receive external pressure that results in a force that transfers through the downhole sensor apparatus to an interface defined by a contact area between the first surface and the interior surface. The contact area of the interface is smaller than the exterior surface. Drill string components, such as earth-boring and downhole tools, incorporating such a downhole sensor apparatus and methods of using same are also disclosed.

20 Claims, 9 Drawing Sheets

(51) Int. Cl.

| | |
|---|---|
| ***E21B 47/017*** | (2012.01) |
| ***G01L 7/02*** | (2006.01) |
| ***G01L 7/08*** | (2006.01) |
| ***G01L 19/14*** | (2006.01) |

(56) References Cited

U.S. PATENT DOCUMENTS

| | | | | |
|---|---|---|---|---|
| 7,497,276 | B2 * | 3/2009 | Pastusek | E21B 47/00 73/152.45 |
| 7,604,072 | B2 | 10/2009 | Pastusek et al. | |
| 7,987,925 | B2 | 8/2011 | Pastusek et al. | |
| 8,016,050 | B2 | 9/2011 | Teodorescu | |
| 8,028,764 | B2 | 10/2011 | Teodorescu | |
| 8,100,196 | B2 | 1/2012 | Pastusek et al. | |
| 10,662,755 | B2 | 5/2020 | Yao et al. | |
| 10,670,762 | B2 * | 6/2020 | Ang | E21B 47/017 |
| 11,162,350 | B2 | 11/2021 | Dunbar | |
| 11,466,559 | B2 * | 10/2022 | Evans | E21B 45/00 |
| 2001/0042643 | A1 * | 11/2001 | Krueger | E21B 17/0283 175/73 |
| 2006/0065395 | A1 * | 3/2006 | Snell | E21B 47/01 175/45 |
| 2014/0265732 | A1 * | 9/2014 | Dallas | B06B 1/0644 310/337 |
| 2017/0051578 | A1 | 2/2017 | Christie et al. | |
| 2018/0066513 | A1 | 3/2018 | Sugiura et al. | |
| 2022/0034218 | A1 | 2/2022 | Evans et al. | |
| 2022/0034223 | A1 | 2/2022 | Evans et al. | |

OTHER PUBLICATIONS

International Written Opinion for International Application No. PCT/US2023/066887 dated Sep. 12, 2023, 5 pages.

* cited by examiner 138
166
208
208
168
Y
Z
X 138
202
164
Y
X
Z 136
161
152
210
210
212
212
210
210

136
161
154
212
210
210
212
210
210
A
A

Y
Z
X

DOWNHOLE SENSOR APPARATUS, SYSTEM, AND RELATED METHODS

TECHNICAL FIELD

Embodiments of the present disclosure generally relate to earth-boring operations. In particular, embodiments of the present disclosure relate to downhole sensors, and related apparatuses, systems and methods.

BACKGROUND

Wellbore drilling operations generally involve the use of an earth-boring tool at the end of a string of drill pipe, which is commonly referred to as a "drill string." An earth-boring tool may be used for drilling through geological formations. In some cases, the earth-boring tool may be configured to drill through additional elements that may be present in a wellbore, such as cement, casings (e.g., a wellbore casing), discarded or lost equipment (e.g., fish, junk, etc.), and/or packers. In some cases, earth-boring tools may be configured to drill through plugs (e.g., fracturing plugs, bridge plugs, cement plugs, etc.). In some cases, the plugs may include slips or other types of anchors and the earth-boring tool may be configured to drill through the plug and any slip, anchor, and other component thereof.

The earth-boring tool and other components of a drill string may include sensors configured to capture and/or store information acquired downhole. The downhole information may include environmental conditions, such as downhole temperature, pressure, etc. In some cases, the downhole information may include operational parameters, such as weight on bit (WOB), rotational speed (RPM), fluid flow rates, etc. In some cases, the downhole information may include formation properties, such as lithology, porosity, strength, etc.

The downhole information may be collected and/or analyzed in real-time or at a later time. For example, the downhole information may be collected through a logging while drilling (LWD) or measuring while drilling (MWD) operation. The downhole information may enable an operator to make decisions, such as a type of earth-boring tool to use, operational decisions, tripping decisions, path decisions, etc.

BRIEF SUMMARY

Some embodiments of the present disclosure may include a downhole sensor apparatus. The downhole sensor apparatus may include a first surface at a first end of the downhole sensor apparatus, a sensor coupled to the downhole sensor apparatus, and an exterior surface at a second, opposite end of the downhole sensor apparatus. The downhole sensor apparatus may be configured to be inserted into a recess of a drill string component such that the first surface is adjacent an interior surface of the drill string component within the recess. The exterior surface of the downhole sensor apparatus may be configured to receive external pressure that results in a force that transfers through the downhole sensor apparatus to an interface defined by a contact area between at least a portion of the first surface of the downhole sensor apparatus and the interior surface of the drill string component within the recess. The contact area of the interface may be smaller than an area of the exterior surface.

Another embodiment of the present disclosure may include a drill string component. The drill string component may include a sensor structure, a force sensor, and a cap on the sensor structure. The sensor structure may include a first surface and a second surface opposite the first surface. The sensor structure may be within a recess of the drill string component such that at least a portion of the first surface contacts at least a portion of an interior surface of the drill string component within the recess. The force sensor may be within the recess and coupled to the sensor structure. The force sensor may be configured to measure a force applied to the sensor structure. The cap may include an exterior surface exhibiting an exterior surface area and a base surface opposite the exterior surface. The exterior surface may be configured to receive external pressure that results in a force that transfers through the cap to an interface defined by a contact area between the at least a portion of the first surface of the sensor structure and the at least a portion of the interior surface of the drill string component within the recess. The contact area of the interface may be smaller than the exterior surface area of the cap.

Another embodiment of the present disclosure may include a method of operating a sensor apparatus for a downhole tool. The method may include receiving, at the sensor apparatus, an external pressure resulting in a force that secures a sensor structure of the sensor apparatus within a recess of the downhole tool such that a sensor of the sensor apparatus is capable of detecting at least one drilling parameter of the downhole tool. An exterior surface of the sensor apparatus may be larger than an interface defined by a contact area between the sensor structure and an interior surface within the recess of the downhole tool. The method may additionally include detecting, via the sensor of the sensor apparatus, the at least one drilling parameter selected from a torsional force about a central longitudinal axis of the downhole tool and a compressive force along the central longitudinal axis of the downhole tool.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
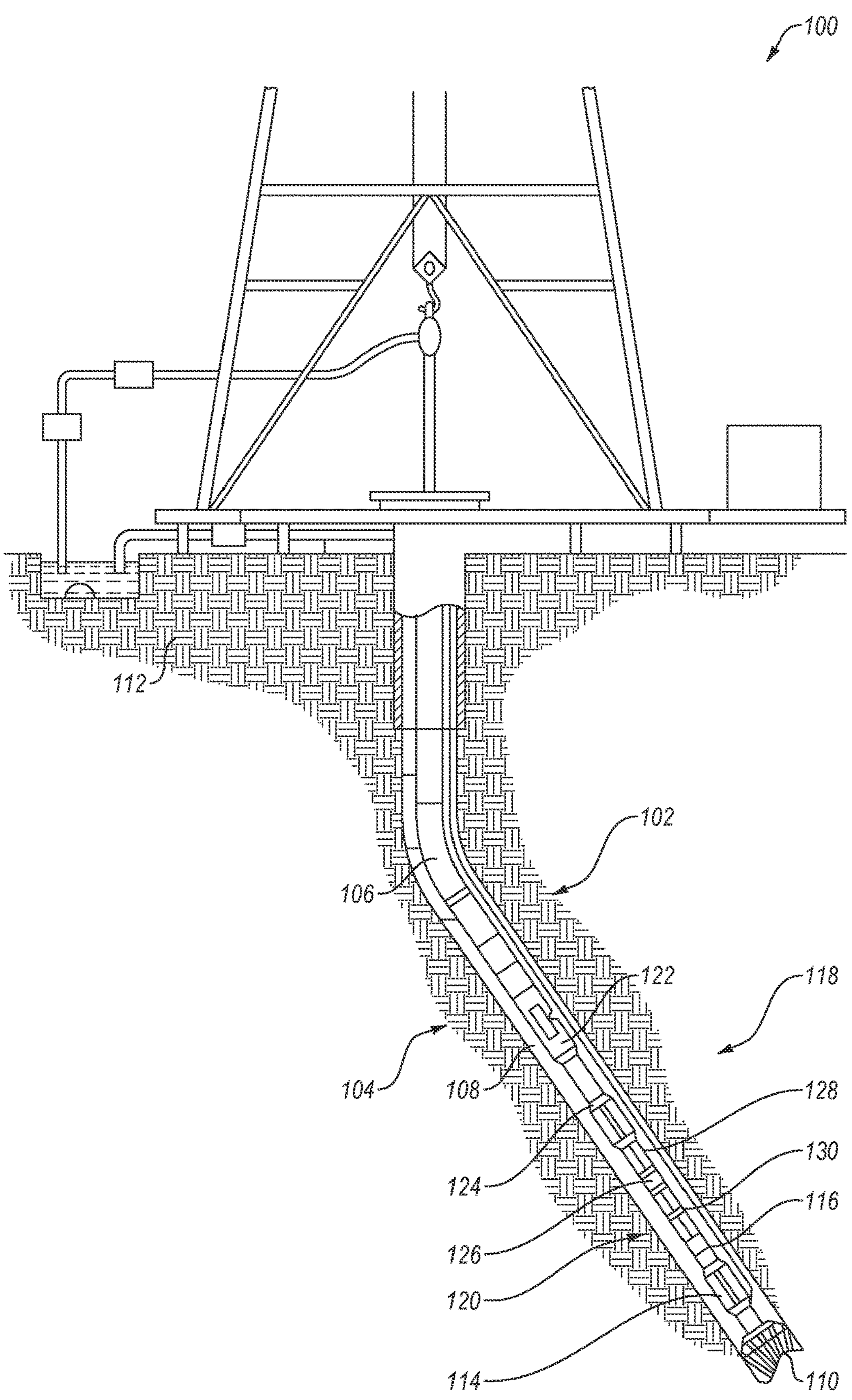
FIG. 1 shows an earth-boring system, in accordance with embodiments of the present disclosure.

The illustrations presented herein are not meant to be actual views of any particular earth-boring system or component thereof, but are merely idealized representations employed to describe illustrative embodiments. The drawings are not necessarily to scale.

As used herein, the term "earth-boring tool" means and includes any type of bit or tool used for drilling during the formation or enlargement of a wellbore in a subterranean formation. For example, earth-boring tools include fixed-cutter bits, roller cone bits, percussion bits, core bits, eccentric bits, bicenter bits, reamers, mills, drag bits, hybrid bits (e.g., including rolling components in combination with fixed cutting elements), and other drilling bits and tools known in the art. Earth-boring tools may also include tool control components, such as, directional assemblies, stabilizers, motors, steering pads, etc., as well as other drill-string components, the term "earth-boring tool" as used herein not being limited to a component of a drill string for forming, enlarging or otherwise modifying a wellbore in a subterranean formation.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, relational terms, such as "first," "second," "top," "bottom," "above," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

Embodiments of the present disclosure may be configured to utilize downhole drilling fluid pressure during drilling operations to improve the accuracy of sensor measurements within a variety of different drill string components, such as earth-boring tools (e.g., reamers, drill bits, etc.), drill collars, mud motors, etc.

Embodiments of the present disclosure may include a sensor apparatus configured to be positioned within a variety of different drill string components such as earth-boring tools (e.g., reamers, drill bits, etc.), drill collars, mud motors, etc. The sensor apparatus may include sensors configured to measure drilling parameters, such as forces (e.g., torsion, compression, tension, etc.) within the respective drill string component.

In addition, embodiments of the present disclosure may be configured to utilize downhole drilling fluid pressure to secure the sensor apparatus to the drill string component and/or to secure one or more components of the sensor apparatus together. For example, the sensor apparatus may include an exterior surface exhibiting a relatively large surface area and an interior interface exhibiting a smaller surface area than the exterior surface.

Once the sensor apparatus is positioned within a drill string component, external forces and/or pressure (e.g., drilling fluid pressure) applied to the exterior surface of the sensor apparatus may amplify contact pressure at the interior interface to secure the sensor apparatus within and to the drill string component. Increased contact pressure to secure the sensor apparatus and the sensors within the drill string component also increases static friction (e.g., due to material seizing of at least a portion of the sensor apparatus), which may help to secure the sensor apparatus to the drill string component. Thus, internal forces within the drill string component may transfer to the sensor apparatus rather than moving or adjusting the sensor apparatus, which results in inaccurate sensor measurements. As a result, changes in drilling parameters (e.g., forces) affecting drill string components may be more accurately captured by the sensors of the sensor apparatus than conventional systems. More accurate data gathering may enhance decision making, which may improve drilling operations (e.g., reduce time to drill wells, result in more productive wells, etc.) and may also improve longevity of drill string components during drilling operations.

FIG. 1 illustrates an earth-boring system 100. An earth-boring system 100 may include a drill string 102 made up of drill string components 104 that includes sections of drill pipe 106 coupled together end-to-end and inserted into a wellbore 108. The wellbore 108 may be formed and/or enlarged (e.g., elongated) by rotational movement of an earth-boring tool 110 (e.g., a first earth-boring tool) engaging a formation 112 at the downhole end of the drill string 102. For example, the earth-boring tool 110 may rotate by circulating drilling fluid through a motor 114 and/or by a drilling rig (e.g., a top drive rig or a Kelly rig) rotating the drill string 102. As drilling progresses, the wellbore 108 elongates, and additional sections of drill pipe 106 may be sequentially coupled to the uphole end of the drill string 102.

The drill string 102 may include multiple drill string components 104, such as sections of drill pipe 106, one or more drill collars 116, and a bottom hole assembly (BHA) 118. The BHA 118 is generally located at the downhole end of the drill string 102. The BHA 118 may include downhole tools 120, such as a measuring-while-drilling (MWD) subassembly, a logging-while-drilling (LWD) subassembly, as a motor 114 (e.g., mud motor), a second earth-boring tool 122 (e.g., a reamer), and/or stabilizers 124, and the earth-boring tool 110 (e.g., a drill bit). The BHA 118 may also include electronics, such as sensors 126, modules 128, and/or tool control components 130. The tool control components 130 may be configured to control an operational aspect of the earth-boring tool 110. For example, the tool control components 130 may include a steering component configured to change an angle of the earth-boring tool 110 with respect to the drill string 102 changing a direction of advancement of the drill string 102. The tool control components 130 may be configured to receive instructions from an operator at the surface and perform actions based on the instructions. In some embodiments, control instructions may be derived downhole within the tool control components 130, such as in a closed-loop system.

The sensors 126 may be configured to collect information (e.g., drilling parameters) regarding the downhole conditions such as temperature, pressure (e.g., downhole drilling fluid pressure, formation pressure, etc.), vibration, fluid density, fluid viscosity, cutting density, cutting size, cutting concentration. The sensors 126 may also be configured to collect information (e.g., drilling parameters) regarding the formation, such as formation composition, formation density, and/or formation geometry. The sensors 126 may be configured to collect information (e.g., drilling parameters) regarding the drill string components 104, such as temperature, axial and/or radial forces on the drill string component 104, torque on the drill string component 104, rotational speed (RPM) of the drill string component 104, drilling fluid pressure at the drill string component, and/or fluid flow rate at the drill string component 104. The sensors 126 may further be configured to collect information (e.g., drilling parameters) regarding the earth-boring tool 110, such as tool temperature, cutter temperature, cutter wear, weight on bit (WOB), torque on bit (TOB), string rotational speed (RPM), drilling fluid pressure at the earth-boring tool 110, and/or fluid flow rate at the earth-boring tool 110.

The information (e.g., drilling parameters) collected by the sensors 126 may be processed, stored, and/or transmitted by the modules 128. For example, the modules 128 may receive the information from the sensors 126 in the form of raw data, such as a voltage (e.g., 0-10 VDC, 0-5 VDC, etc.), an amperage (e.g., 0-20 mA, 4-20 mA, etc.), or a resistance (e.g., resistance temperature detector (RTD), thermistor, etc.). The module 128 may process raw sensor data and transmit the data to the surface on a communication network, using a communication network protocol to transmit the raw sensor data. The communication network may include, for example, a communication line, mud pulse telemetry, electromagnetic telemetry, and/or wired pipe. In some embodiments, the modules 128 may be configured to run calculations with the raw sensor data, for example, calculating a viscosity of the drilling fluid using the sensor measurements (e.g., of the drilling parameters) such as temperatures, pressures or calculating a rate of penetration of the earth-boring tool 110 using sensor measurements such as cutting concentration, cutting density, WOB, and/or formation density.

While FIG. 1 illustrates the sensors 126 as being located within a single drill string component 104, the disclosure is not so limited. The sensors 126 may be positioned in any of the drill string components 104 of the drill string. One or more of the sensors 126 may be concentrated in areas of the drill string that are of interest (e.g., within the drill string components 104 of the BHA 118, the second earth-boring tool 122, the earth-boring tool 110, etc.). In some embodiments, only a single drill string component 104 may include the sensors 126. In additional embodiments, multiple drill string components 104 may include the sensors 126. In further embodiments, the sensors 126 may be placed within each individual drill string component 104 of the drill string 102 to gather downhole information (e.g., drilling parameters) at every drill string component 104 of the drill string 102.

In some embodiments, the downhole information (e.g., drilling parameters) may be transmitted to the operator at the surface or to a computing device at the surface. For example, the downhole information may be provided to the operator through a display or a printout. In some embodiments, the downhole information may be transmitted to a computing device that may process the information and provide the information to the operator in different formats useful to the operator. For example, measurements that are out of range may be provided in the form of alerts, warning lights, and/or alarms. Some information may be provided live in the form of a display and/or spreadsheet, whereas other information that may not be useful until further calculations are performed may be processed and the result of the calculation may be provided in the display, print out, and/or spreadsheet.

In some embodiments, the downhole information (e.g., drilling parameters) may be stored in the sensors 126 or modules 128 and downloaded by an operator when the earth-boring tool 110 and/or the drill string 102 are tripped out of the hole. In some cases, the sensors 126 and/or modules 128 may be positioned in areas of the earth-boring tool 110 and/or drill string 102 where it is difficult to connect wiring between modules 128, such as network or power wiring. Thus, it may be difficult to power the sensors 126 and/or modules 128 and access the downhole information stored in and/or measured by the sensors 126 and modules 128.

In some cases, the sensors 126 and/or modules 128 may include internal power storage, such as batteries, battery packs, and/or power cells. In some cases, the sensors 126 and/or the modules 128 may include internal storage and or processors, configured to process and store the downhole information. Sensors 126 and/or modules 128 with internal power storage and/or data storage may require additional considerations. For example, the internal power storage may have a limited amount of power stored therein. Thus, if the internal power storage exhausts the power stored therein, the associated sensors 126 and/or modules 128 may stop collecting downhole information before the sensors 126 and/or modules 128 are removed from the wellbore 108.

In some cases, accessing the downhole information (e.g., drilling parameters) stored in the internal power storage may be difficult. For example, the data storage for the sensors 126 and/or the modules 128 may be positioned within the associated downhole tool 120 (e.g., downhole tool or subassembly). The downhole tool 120 and/or housings, coverings, may protect the sensitive electronics such as the data storage from downhole conditions that may include high temperatures, high pressures, debris, and/or corrosive liquids. Thus, accessing the downhole information may require removing the sensors 126 and/or modules 128 from the downhole tool 120 after the downhole tool 120 is removed from the wellbore 108, which may require additional time and/or sophisticated tools and/or operators to complete. Furthermore, removing the sensors 126 and/or the modules 128 from the downhole tool 120 tool may increase the chances that one or more of the sensors 126 and/or the modules 128 may be damaged during the removal process, which may cause the downhole information to become corrupted or lost.

Figure 2:
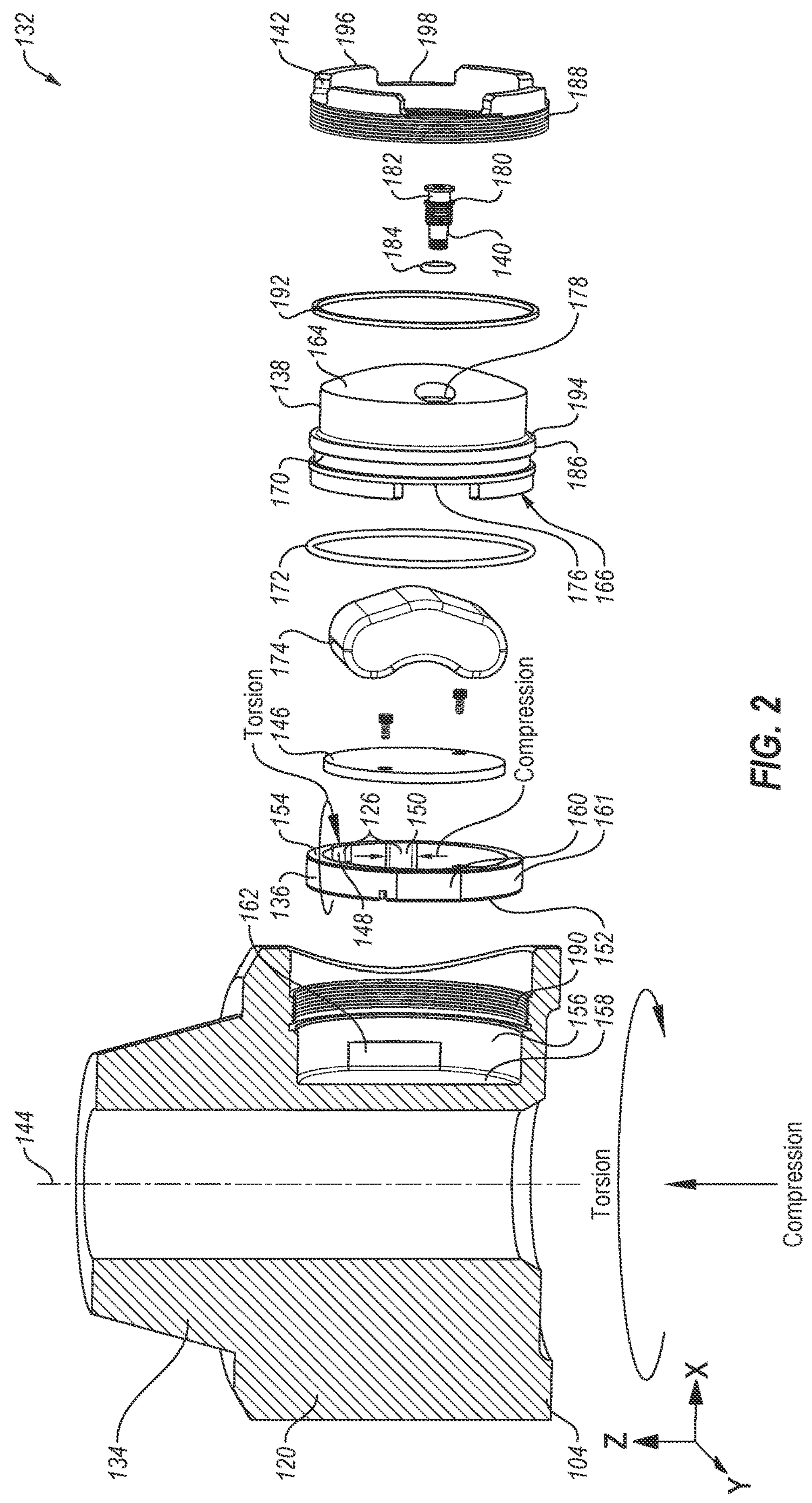
FIG. 2 is an exploded view of a sensor apparatus, in accordance with embodiments of the present disclosure.

FIG. 2 illustrates an exploded view of a sensor apparatus 132 (e.g., a downhole sensor apparatus). The sensor apparatus 132 may be configured to be inserted into the drill string component 104 (FIG. 1), such as a section of the drill pipe 106 (FIG. 1), a drill collar 116 (FIG. 1), and/or a downhole tool 120 (FIG. 1). The downhole tool 120 may include, for example, a drill bit, an under reamer, a reamer, a stabilizer, a mud motor, a measuring while drilling (MWD) subassembly, and/or a logging while drilling (LWD) subassembly. In some, the sensor apparatus 132 may be installed near a shank 134 of the drill string component 104 (e.g., the downhole tool 120). For drill string components 104 with relatively thin sections (e.g., central portions of the drill pipe 106), the sensor apparatus 132 may be configured to be inserted into a thicker section of the drill string component 104 (e.g., proximate a tool joint of the drill pipe 106). The sensor apparatus 132 may include a sensor structure 136, a cap 138, a data port 140, and a locking ring 142.

Sensor apparatus 132 and sub-components of the sensor apparatus 132, such as the sensor structure 136, the cap 138, the data port 140, and/or the locking ring 142 may be made of or include one are more materials that are configured with withstand the downhole environment. As non-limiting examples, the sensor structure 136 and/or the cap 138 may be made of or include polymers, metals (including alloys), composite materials (e.g., fiberglass, carbon fiber composites), or any combination or sub-combination thereof.

Although depicted as a single sensor apparatus 132 and a single drill string component 104, the disclosure is not so limited. The sensor apparatus 132 may be positioned in any of the drill string components 104 (FIG. 1) of the drill string 102 (FIG. 1). One or more sensor apparatuses 132 may be concentrated in areas of the drill string 102 (FIG. 1) that are of interest (e.g., within the drill string components 104 of the BHA 118, the second earth-boring tool 122, the earth-boring tool 110, etc.). In some embodiments, only a single drill string component 104 may include the sensor apparatus 132. In additional embodiments, multiple drill string components 104 may include sensor apparatuses 132. In further embodiments, one or more sensor apparatuses 132 may be placed within each individual drill string component 104 of the drill string 102 (FIG. 1) to gather data at every drill string component 104 of the drill string 102 (FIG. 1).

During drilling operations, the drill string component 104 may be subjected to a variety of downhole conditions, such as temperatures, pressures, forces, etc. Friction between a rotating drill string 102 (FIG. 1) and the formation 112 (FIG. 1) may result in torsion forces about a central longitudinal axis 144 of the drill string component 104. In addition, weight applied to the drill bit to drill the formation 112 (FIG. 1) may result in compressive force within the drill string component 104 substantially aligned with the central longitudinal axis 144 of the drill string component 104, as shown. The downhole conditions, such as the forces within the drill string component 104 may transfer into the sensor apparatus 132 such that torsion forces and compressive forces may be measured by the sensors 126.

The sensor structure 136 may include a sensor board 146 (e.g., circuit board) coupled to the sensor structure 136. The sensor structure 136 and/or the sensor board 146 may house one or more sensors 126, such as accelerometers, force sensors, pressure sensors, torque sensors, temperature sensors, vibration sensors, gyroscopes, gyrometers, and/or magnetometers. For detection and/or measurements, the sensors 126 may include one or more strain gauges (e.g., linear strain gauges, membrane Rosette strain gauges, double linear strain gauges, full bridge strain gauges, shear strain gauges, half bridge strain gauges, column strain gauges, 45-degree-Rosette strain gauges, 90-degree-Rosette strain gauges, etc.). The one or more sensors 126 may be arranged about the sensor structure 136 and/or the sensor board 146 such that multiple different types of information (e.g., drilling parameters) may be measured and/or calculated based on the sensor 126 readings. For example, the sensor structure 136 may include a first sensor 148 (e.g., a torsion sensor), and a second sensor 150 (e.g., a compressive gauge) coupled to the sensor structure 136 to measure torsion forces and compressive forces, respectively, within the drill string component 104.

Arrangements of multiple sensors, such as accelerometers, may enable the sensor structure 136 and/or the sensor board 146 to measure and/or calculate operational elements, such as rotational speed, tilt angle, azimuth, azimuthal acceleration, tangential acceleration, and/or lateral acceleration. Some examples of sensor arrangements and methods of capturing different types of information are described in, for example, U.S. patent application Ser. No. 16/945,471 to Evans et al. (Jul. 31, 2000), the disclosure of which is incorporated herein in its entirety by this reference. In some embodiments, multiple different types of sensors may be included on the same structure (e.g., the sensor structure 136 and/or the sensor board 146). For example, the sensor structure 136 may include multiple accelerometers, as well as one or more force sensors, pressure sensors, torque sensors, temperature sensors, vibration sensors, gyroscopes, gyrometers, and/or magnetometers. In addition, the sensor board 146 may include multiple accelerometers, as well as one or more force sensors, pressure sensors, torque sensors, temperature sensors, vibration sensors, gyroscopes, gyrometers, and/or magnetometers.

In some embodiments, the sensor structure 136 (e.g., the sensor board 146 of the sensor structure 136) may include a processor and a memory storage device, configured to process and/or store data gathered (e.g., sensed, detected, measured, etc.) by the one or more sensors 126. For example, the processor and memory storage may be configured to process raw data from the one or more sensors 126 and store the resulting downhole information (e.g., drilling parameters). In some embodiments, the processor and memory storage may store the raw sensor information, such as in a database or array, such that a processor may calculate downhole information from the raw sensor information after the raw data is extracted from the memory storage device. In some embodiments, the processor may be part of an external device configured to calculate downhole information after the data is transmitted from the sensor structure 136 to the external device.

The sensor structure 136 may include a first surface 152 (e.g., abase surface) and a second surface 154 opposite the first surface 152. The sensor structure 136 may be configured to be disposed (e.g., inserted) into a recess 156 of a drill string component 104 such that at least a portion of the first surface 152 contacts (e.g., abuts) an interior surface 158 of the drill string component 104 within the recess. An area of the first surface 152 may be larger, smaller, or substantially the same as an area the second surface 154. For example, the second surface 154 may be at least about 10% larger, about 20% larger, about 30% larger, about 40% larger, about 50% larger, about 60% larger, about 70% larger, about 80% larger, or about 90% larger than the first surface 152. As additional non-limiting examples, a ratio of the surface area of the second surface 154 to the first surface 152 may be within a range of from about 2:1 to about 50:1, such as from about 3:1 to about 40:1, from about 4:1 to about 30:1, from about 5:1 to about 20:1, such as from about 6:1 to about 10:1 (e.g., about 8:1).

The sensor structure 136 and the sensor board 146 may exhibit any desired shapes. For example, the sensor structure 136 may exhibit a hollow ring shape such that the sensor structure 136 includes an exterior wall surrounding a central opening extending through sensor structure 136. The sensor structure 136 may exhibit an annular cylinder shape, a triangular ring shape, a square ring shape, a hexagonal ring shape, etc. The sensor board 146 may exhibit a shape that is complementary to the sensor structure 136 such that the sensor structure 136 substantially surrounds the sensor board 146. For example, the sensor board 146 may exhibit a cylindrical shape complementary to an annular cylinder-shaped sensor structure 136, the sensor board 146 may exhibit a square shape complementary to a square-shaped sensor structure 136, etc. Portions (e.g., edges) of the sensor structure 136 may be rounded, beveled, chamfered, etc.

The sensor structure 136 may be configured to provide structural support to the sensor board 146. In addition, the sensor board 146 may be secured to the sensor structure 136 via fasteners (e.g., bolts, screws, nails, etc.). The sensor structure 136 may extend above and below a top and bottom surface of the sensor board 146 greater than any sensor 126 or device attached to the surface of the sensor board 146. For example, if the sensor structure 136 and sensor board 146 supported by the sensor structure 136 are placed against a substantially flat surface, a portion of the sensor structure 136 (e.g., the first surface 152 or the second surface 154) may be the only portion of the sensor structure 136 and the sensor board 146 to contact the substantially flat surface. In some embodiments, the sensor structure 136 may include additional structural pieces, such as bracing and/or mounting brackets to provide further support and protection to the sensor board 146.

In some embodiments, the sensor structure 136 may be configured to orient the sensors 126 and/or the sensor board 146 relative to the drill string component 104 (e.g., the downhole tool 120). The sensor structure 136 may rest against the interior surface 158 within the recess 156 of the drill string component 104. The interior surface 158 may be configured to interface with the first surface 152 of the sensor structure 136, such that the interior surface 158 defines a radial position of the sensor structure 136 relative to the drill string component 104. The sensor structure 136 may include an alignment feature 160 (e.g., orientation feature, such as a key surface) on a sidewall 161 of the sensor structure. The alignment feature 160 may be configured to orient the sensor structure 136 within the recess 156. For example, the recess 156 may include a corresponding (e.g., complementary) alignment feature 162 (e.g., orientation feature, such as a key surface) configured to interface with the alignment feature 160 in the sensor structure 136. As illustrated in FIG. 2, the alignment feature 162 and the alignment feature 160 may be complementary flat (e.g., planar or straight) surfaces in otherwise circular surfaces. In some embodiments, the alignment feature 162 and the alignment feature 160 may be a complementary protrusion and groove, such as a key and a key way.

In some embodiments, the alignment feature 162 within the recess 156 and the alignment feature 160 of the sensor structure 136 may be configured to only allow the sensor structure 136 to be inserted in the recess 156 in a single orientation. In some embodiments, the alignment feature 162 and the alignment feature 160 may be configured to only allow the sensor structure 136 to be inserted into the recess 156 in one of a select number of orientations such as two orientations, four orientations, etc. For example, the alignment feature 162 and the alignment feature 160 may allow the sensor structure 136 to be inserted into the recess 156 in two orientations each 180 degrees offset from the other. In some embodiments, the alignment feature 162 and the alignment feature 160 may allow the sensor structure 136 to be inserted into the recess 156 in one of four orientations each 90 degrees offset from the other.

In some embodiments, the alignment feature 162 and the interior surface 158 may be calibration surfaces configured to define an orientation and/or position of the sensor structure 136 and any associated sensors relative to the drill string component 104 (e.g., the downhole tool 120). The interfaces between the alignment feature 162 and the alignment feature 160 and/or the interior surface 158 and the first surface 152 of the sensor structure may at least partially affect the accuracy of the sensors associated with the sensor structure 136. For example, some sensor measurements (e.g., of drilling parameters) may be affected by an orientation and/or position of the sensor relative to the drill string component 104. In some embodiments, tolerance errors in any of the alignment feature 162, alignment feature 160, interior surface 158, and/or first surface 152 may transfer into the measurements from the associated sensors.

Controlling the orientation of the sensor structure 136 and the sensor board 146 may enable sensors thereon to measure specific characteristics of the drill string component 104, such as orientation, rotational velocity, vibrations, torque, tilt, etc. For example, positioning several sensors in specific orientations relative to the drill string component 104 may enable differences between the sensors to be used to calculate specific characteristics of the drill string component 104 (e.g., the downhole tool 120) as described in, for example, U.S. patent application Ser. No. 16/945,471 to Evans et al. (Jul. 31, 2000), the disclosure of which has been previously incorporated by reference herein.

The cap 138 may be configured to rest against a top surface of the sensor structure 136. The cap 138 may secure the sensor structure 136 within the recess 156 in the drill string component 104. For example, the cap 138 may sandwich the sensor structure 136 between a base surface 166 of the cap 138 and the interior surface 158 of the recess 156, and an exterior surface 164 of the cap 138 may be exposed to the wellbore 108. The cap 138 may be configured to separate the sensor structure 136, the sensor board 146, and/or the sensors 126 from the downhole environment. For example, the downhole environment may include high temperatures, high pressures, debris, and fluids (e.g., oil, water, drilling mud, caustic fluids, corrosive fluids, etc.). The exterior surface 164 and/or the remainder of the cap 138 may protect the sensor structure 136, the sensor board 146, and/or the sensors 126 from downhole conditions that may otherwise damage the sensor structure 136, the sensor board 146, and/or the sensors 126 and/or the components thereof.

In some embodiments, the cap 138 may be rigid such that the cap 138 resists any external force and/or pressure (e.g., drilling fluid pressure) applied to the exterior surface 164 of the cap 138 without deflecting. An interior cavity 168 (FIG. 3) of the cap 138 may be defined by an exterior sidewall portion of the cap 138 between the exterior surface 164 and the base surface 166. The interior cavity 168 may remain at substantially constant (e.g., atmospheric pressure) when external force and/or pressure is applied to the exterior surface 164 of the cap 138.

In some embodiments, the cap 138 may be configured to transfer one or more parameters of the downhole environment (e.g., drilling fluid pressure) to the sensor structure 136 and/or the sensor board 146, and/or the sensors 126. A pressure sensor on the sensor structure 136 (e.g., on the sensor board 146) may measure the pressure transferred through the cap 138. For example, the cap 138 may deform under external pressure until the pressure on both sides of the cap 138 equalizes. In some embodiments, the cap 138 may be configured such that a portion of the cap 138 is configured to move relative to the sensor structure 136 and/or the sensor board 146. The movable portion (e.g., the exterior surface 164) of the cap 138 may move in or out of the cap 138 to equalize the pressure on each side of the portion of the cap 138. A pressure sensor on the sensor structure 136 (e.g., on the sensor board 146) may measure the pressure in the interior cavity 168 (FIG. 3) when the cap 138 is positioned within the recess 156 of the drill string component 104 (e.g., the downhole tool 120). When the pressure is equalized on each side of the cap 138 or portion of the cap 138, the pressure around the sensor structure 136, the sensor board 146, and/or the sensors 126 may be substantially the same as the downhole pressure.

Figure 3:
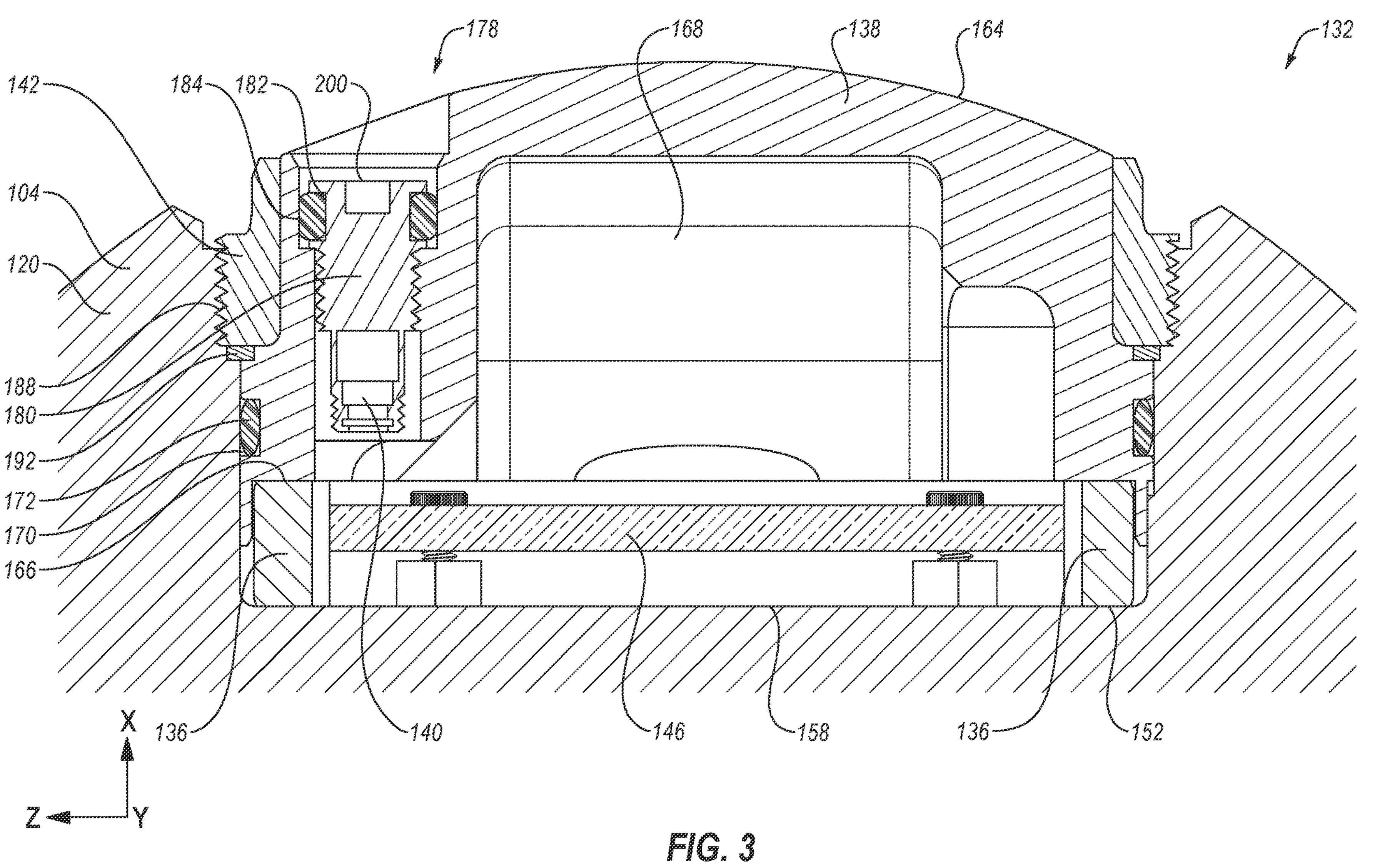
FIG. 3 is a cross-sectional view of the sensor apparatus of FIG. 2 in the assembled state, in accordance with embodiments of the present disclosure.

The cap 138 may include one or more seal grooves 170 around the base surface 166. The seal groove 170 may be configured to receive one or more seals 172 to form a seal between the cap 138 and a wall of the recess 156 in the drill string component 104. The one or more seals may be configured to substantially prevent the ingress and/or egress of fluids into and/or out of the interior cavity 168 (FIG. 3).

In addition, the interior cavity 168 (FIG. 3) may be configured to receive a power storage device 174, such as a battery or battery pack that may provide power to sensors 126 and/or the sensor board 146. For example, the power storage device 174 may be configured to connect to the sensors 126 and/or the sensor board 146 via power connections, such as leads, wires, terminals, posts, and/or plugs, and the power connections on the sensors 126 and/or the sensor board 146.

The cap 138 may include one or more recesses 176 in the base (e.g., within the base surface 166) of the cap 138. In some embodiments, the recesses 176 may be configured to interface with the alignment feature 162 and/or the alignment feature 160 to position the cap 138 relative to the sensor structure 136 and/or the drill string component 104. For example, the recesses 176 may encompass the region defined by the alignment feature 162 of the recess 156 and the alignment feature 160 of the sensor structure 136, such that the recesses 176 may substantially inhibit (e.g., prevent) rotation of the cap 138 relative to the sensor structure 136 and the drill string component 104.

The cap 138 may include a communication feature 178. In some embodiments, the communication feature 178 is an opening (e.g., aperture, pocket, recess, etc.) configured to receive the data port 140. The data port 140 may be coupled to the sensor board 146 through the cap 138, and the sensor board 146 may be coupled to one or more sensors 126 on the sensor structure 136. For example, the data port 140 may be connected to wires or leads extending from the sensor board 146. In some embodiments, the data port 140 may be connected to a connector, such as a pin connector, locking connector, terminal connector, high speed serial peripheral interface (high speed SPI), etc. In some embodiments, the data port 140 may be wirelessly connected to the sensor board 146, such as through a radio frequency transmitter and/or receiver.

In some embodiments, the data port 140 may be configured as a data access port of the sensor board 146. For example, the data port 140 may be operatively connected to the sensor board 146, such as to the processor or memory device in the sensor board 146. The data port 140 may be configured to enable a connection to the sensor board 146 through the cap 138 without requiring the removal of the sensor apparatus 132 from the drill string component 104. For example, the data port 140 may include a connector configured to receive a wired connection, such as a network connection (e.g., Ethernet, RJ45, RJ11, RJ12, RS485, etc.) or serial connection (e.g., DB9, RS-138, universal serial bus (USB), etc.) from an external source, such as a computer, tablet, network connection, server, controller, etc.

In some embodiments, the data port 140 may be configured to wirelessly transmit data from the sensor board 146. For example, the data port 140 may be a wireless receiver and/or transmitter. The data port 140 may be configured to transmit data under a wireless protocol, such as BLUETOOTH®, 2G, 3G, 4G, 5G, RFID, Wi-Fi, etc. For example, the data port 140 may receive downhole information and/or raw sensor data, such as the data stored in the memory device of the sensor structure 136 (e.g., the sensor board 146).

The data port 140 may be configured to receive data, such as configuration data, programming data, firmware, updates, etc., from an external device (e.g., computer, tablet, network, server, cloud, etc.). For example, the data port 140 may be configured to receive the data from the external device and push the data into the sensor board 146. In some embodiments, the data may change an operation of the sensor board 146, such as a sequence of operations, a method of converting sensor readings, a method of storing sensor readings, etc. In some embodiments, the data may correct software problems, such as software patches, bug fixes, etc. In some embodiments, the data may configure the sensor board 146 for operation in a different type of operation, such as for placement on a different type of tool, placement in a different portion of a drill string, using a tool in a different operation, etc. In some embodiments, the data may be calibration coefficients and/or logged data.

In some embodiments, the cap 138 may include a removable plug 180 over the communication feature 178. For example, after the data port 140 is inserted into the communication feature 178 of the cap 138, the removable plug 180 may be installed into the communication feature 178. The removable plug 180 may be configured to protect the data port 140 from the downhole environment, similar to the protections afforded to the sensor board 146 by the cap 138. The removable plug 180 may be configured to be removed to enable a connection with the data port 140 from an external device. For example, with the removable plug 180 removed a wired connection, as described above, may be connected to the data port 140. In some embodiments, removing the removable plug 180 may enable the data port 140 to send and or receive a reliable wireless signal to and/or from an external device as described above.

In some embodiments, the removable plug 180 may include other integrated devices, such as sensors. For example, the removable plug 180 may include a pressure sensor. In some embodiments, the removable plug 180 may be a removable pressure transducer configured to measure pressure and simultaneously protect the data port 140 from the downhole environment. In some embodiments, the pressure transducer may be coupled to the sensor board 146 through the data port 140. In some embodiments, the pressure transducer may be wirelessly coupled to the sensor board 146. In some embodiments, the pressure transducer may be coupled to another sensor module. In some embodiments, the pressure transducer may be substantially standalone.

The removable plug 180 may include one or more seal grooves 182. One or more seals 184, such as O-rings, D-rings, etc., may be disposed in the seal grooves 182. The one or more seals 184 may be configured to form a seal between the removable plug 180 and the cap 138. For example, the one or more seals 184 may substantially prevent the ingress of downhole fluid or debris into the data port 140.

In some embodiments, the communication feature 178 may be an area of the cap 138 that is configured to be transparent to radio frequencies (e.g., RF transparent, RF window, etc.). For example, at least a portion of the cap 138 may be formed from a material that is substantially transparent to radio frequencies. A radio frequency transparent material is a material that radio frequency fields or signals may penetrate without losing energy to heat or reflecting off the material, such as polytetrafluoroethylene (e.g., PTFE, TEFLON®), quartz, glass materials, high temperature polyetheretherketone (PEEK), etc. In some embodiments, the cap 138 may be entirely formed from a radio frequency transparent material. The radio frequency transparent material may enable a transmitter and/or receiver to send and/or receive radio signals through the cap 138.

The cap 138 may include a ridge 186 above the seal groove 170. The locking ring 142 may be configured to engage a corresponding (e.g., complementary) portion of the drill string component 104 (e.g., the downhole tool 120) within the recess 156.

Thus, after each drilling run (e.g., drilling each section of the wellbore 108), the information gathered by the sensor apparatus 132 may be accessed via an electrical connection (e.g., via the communication feature 178 or the removable plug 180) without removing the sensor apparatus 132 from the drill string component 104 (e.g., the downhole tool 120). Accordingly, the sensor apparatus 132 may remain within the drill string component 104 such that hazardous material (e.g., lithium battery) disposal does not need to be maintained at the wellsite.

In some embodiments, the locking ring 142 may include threads 188 configured to interface with corresponding (e.g., complementary) threads 190 within the recess 156 of the drill string component 104. Additionally, the locking ring 142 may be configured to rest against the ridge 186 securing the cap 138 in the recess 156 of the drill string component 104. For example, once the sensor structure 136 and the cap 138 are disposed in the recess 156 of the drill string component 104, the locking ring 142 may engage the threads 190 in the recess 156 with the threads 188 of the locking ring 142. The locking ring 142 may be threaded into the recess 156 until the locking ring 142 engages the ridge 186 of the cap 138.

Although illustrated as a threaded connection, the disclosure is not so limited. In additional embodiments, the locking ring 142 may include a series of teeth configured to interface with corresponding (e.g., complementary) teeth within the recess 156 of the drill string component 104. In further embodiments, the locking ring 142 may include ridges (e.g., spaced 180 degrees apart) configured to seat within complementary openings between a ridge within the recess 156 of the drill string component 104. The ridges of the locking ring 142 may be aligned with the complementary openings and inserted into the recess, and then rotated such that the ridges engage with one another to secure the locking ring 142 and cap 138 within the recess 156 of the drill string component 104. In additional embodiments, the locking ring 142 may include one or more retaining rings 192 (e.g., spiral retaining rings, tapered retaining rings, spiral retaining rings, split washers, crimp washers, or lock washers, etc.) to secure the cap 138 within the recess 156 of the drill string component 104. The retaining ring 192 may be used alone or in combination with other elements of the locking ring 142 described herein. For example, the retaining ring 192 may be positioned within a groove within the recess 156 of the drill string component 104 and may also be positioned on a corresponding edge 194 of the cap 138. As shown in FIG. 3 below, the retaining ring 192 and corresponding groove within the recess 156 may be located between the ridge 186 of the cap 138 and the locking ring 142. An additional retaining ring may seat into another groove within the recess 156 above (e.g., radially outward relative to) the locking ring 142.

Continuing with reference to FIG. 2, the locking ring 142 may have an inside diameter that is substantially the same or greater than a diameter of the cap 138 above the ridge 186. For example, the locking ring 142 may be configured to pass over a top portion of the cap 138 to rest on the ridge 186.

In some embodiments, the locking ring 142 may be configured to tighten into the threads 190 of the recess 156 of the drill string component 104 without contacting the ridge 186 of the cap 138. For example, the cap 138 may be configured to move relative to the drill string component 104 and the locking ring 142 after the locking ring 142 is secured. The locking ring 142 may be configured to prevent the cap 138 from exiting the recess 156 while allowing the cap 138 to move into to the recess 156. Accordingly, the locking ring 142 may enable uni-directional (e.g., tightening) movement of the cap 138, while preventing loosening movement of the cap 138. Such movement may enable the cap 138 to at least partially (e.g., partially, substantially, or entirely) equalize pressure between the downhole environment and the interior cavity 168 (FIG. 3), as described above. Additionally, as will be described below with reference to FIG. 3, the cap 138 being configured to move to apply additional force against the sensor structure 136 against the interior surface 158 of the drill string component 104, which may facilitate more accurate measurements from the sensors 126.

The locking ring 142 may include one or more ridges 196 separated by one or more valleys 198 on a surface of the locking ring 142. The ridges 196 and the valleys 198 may be arranged in a pattern about a circumference of the locking ring 142. The ridges 196 and the valleys 198 may be configured to be engaged by a tool, such as a socket, wrench, screw driver, etc., to tighten and/or loosen the locking ring 142 from the drill string component 104.

The locking ring 142 may enable the sensor structure 136 and the cap 138 to be installed in a specific orientation relative to each other and the drill string component 104. As discussed above, the sensor structure 136 may include an alignment feature 160 configured to limit the orientation of the sensor structure 136 and the sensor board 146 relative to the drill string component 104. The data port 140 may be installed through the communication feature 178 in the cap 138. In some embodiments, the communication feature 178 may need to be arranged over a specific portion of the sensor board 146 to enable a connection between the data port 140 and the sensor board 146. In some embodiments, wires may extend from the sensor board 146 through the communication feature 178 for connection to the data port 140. Turning the cap 138 relative to the sensor board 146 multiple times, such as to screw in the cap 138 may cause the wires to twist multiple times, which may cause damage to the wires and/or the sensor board 146 where the wires connect to the sensor board 146. The locking ring 142 may enable the sensor structure 136 and the cap 138 to be disposed into the recess 156 in the drill string component 104 with minimal twisting of the sensor structure 136 and/or the cap 138 relative to one another and the drill string component 104.

In some embodiments, the sensor structure 136 may be separately secured in the recess 156. For example, the sensor structure 136 may be secured within the recess 156 such that the first surface 152 is secured to the interior surface 158 within the recess 156. The first surface 152 of the sensor structure may be secured to the interior surface 158 within the recess using, for example, an adhesive (e.g., epoxy, glue, etc.), or other physiochemical process (e.g., brazing, welding, soldering, etc.). In certain embodiments, the contact pressure between the cap 138 and the sensor structure 136 may be sufficiently high to increase friction between the cap 138 and the sensor structure 136 (e.g., due to seizing).

FIG. 3 illustrates a cross-sectional view of the sensor apparatus 132. The first surface 152 of the sensor structure 136 may rest against (e.g., abut) the interior surface 158 of the drill string component 104 (e.g., the downhole tool 120). The interior surface 158 of the drill string component 104 (e.g., the downhole tool 120) may or may not exhibit a complementary shape to the shape of the sensor structure 136. For example, in embodiments in which the sensor structure 136 exhibits a chamfered edge proximate the first surface 152, the interior surface 158 may exhibit a cylindrical sidewall, or the interior surface 158 may also exhibit a complementary chamfered edge. The base surface 166 of the cap 138 may rest against the second surface 154 of the sensor structure 136. The sensor structure 136 may be secured between the cap 138 and the drill string component 104. The sensor board 146 may be secured to the sensor structure 136.

In some embodiments, the sensor structure 136 may have a height that is greater than a thickness of the sensor board 146 such that the base surface 166 of the cap 138 may contact the sensor structure 136 without contacting the sensor board 146 or any components thereof. In some embodiments, contact between the cap 138 and the interior surface 158 within the recess 156 of the drill string component 104 may form a hermetically sealed pocket within the interior cavity 168 that contains the sensor structure 136, the sensor board 146, the sensors 126, and/or the power storage device 174. In some embodiments, the interior cavity 168 may allow portions of the sensor board 146 or components thereof to extend above the sensor structure 136 without contacting the cap 138. In some embodiments, the interior cavity 168 may be configured to contain electrical components, such as batteries, transmitters, etc., that may require additional space. In some embodiments, as described above, the interior cavity 168 may allow the cap 138 to equalize pressure between the downhole environment and the interior cavity 168, such that a pressure sensor on the sensor board 146 may measure a pressure of the downhole environment.

In some embodiments, the cap 138 may include a power storage device 174 incorporated into the cap 138. For example, the cap 138 may be formed around the power storage device 174. In some embodiments, the power storage device 174 may be formed as part of the cap 138, such as including multiple battery cells embedded into the cap 138. In some embodiments, the interior cavity 168 within the cap 138 may be configured to receive and/or secure the power storage device 174 therein. In additional embodiments, the cap 138 may include another cavity separate from the interior cavity 168 that may be configured to receive and/or secure the power storage device 174 therein.

In some embodiments, the power storage device 174 may be configured to connect to leads or wires extending from the sensor board 146 into the cap 138. In some embodiments, the cap 138 may be configured to electrically couple the power storage device 174 to the sensor board 146 that may be coupled to the sensors 126 on the sensor board 146 and/or the sensor structure 136. For example, the cap 138 may include electrical contacts, pins, sockets, etc., that are configured to electrically couple to a complementary electrical connection on the sensor board 146, and electrical contacts, pins, sockets, etc., on the sensor board 146 may be configured to be coupled to a complementary electrical connection on the sensors 126.

The power storage device 174 may be a rechargeable battery pack. In some embodiments, the power storage device 174 may be configured to be recharged and reused in the sensor apparatus 132. For example, the power storage device 174 may be charged between uses and reinstalled in the sensor apparatus 132 before the sensor apparatus 132 is disposed downhole in a subsequent drilling run. In some embodiments, the power storage device 174 may be configured to be recharged and transferred to a different sensor apparatus after the sensor apparatus 132 is tripped out of the wellbore 108. In some embodiments, the power storage device 174 may be configured to be charged immediately before disposing the drill string component 104 into the wellbore 108 such that the power storage device 174 may enter the wellbore 108 having a full charge rather than losing charge during transport and/or assembly.

The charge of the power storage device 174 may be conserved by activating and/or deactivating the sensor apparatus 132 and/or components of the sensor apparatus 132. For example, one or more components of the sensor apparatus 132 may be activated through the data port 140. In some embodiments, a connection to the data port 140 may activate one or more components of the sensor apparatus 132 and the loss of the connection to the data port 140 may deactivate the one or more components of the sensor apparatus 132. In some embodiments, one or more components of the sensor apparatus 132 may be activated through a switch. For example, a wireless switch, such as a magnetic switch may be configured to activate and/or deactivate one or more components of the sensor apparatus 132. For example, an operator may activate components needed to transfer data during the data transfer and deactivate the components once the data transfer is complete.

The cap 138 may include one or more seal grooves 170 in the base surface 166 of the cap 138. The seal 172 may be arranged within the seal groove 170. The seal 172 may be configured to form a seal between the base surface 166 of the cap 138 and the drill string component 104. For example, the seal 172 may be formed from a resilient material, such as a polymer, rubber, etc. In some embodiments, the seal 172 may be an annular ring, such as an O-ring, D-ring, etc. The seal 172 may be configured to substantially prevent the ingress of fluid or debris from the downhole environment into the interior cavity 168.

The data port 140 may be inserted into the communication feature 178 in the cap 138. The removable plug 180 may be disposed above the data port 140 in the communication feature 178. In some embodiments, the removable plug 180 may be threadedly secured within the communication feature 178. The removable plug 180 may be configured to substantially prevent fluids and/or debris present downhole from contacting, interfering with, getting caught in, and/or plugging the data port 140.

The removable plug 180 may include a tool interface 200 in a top portion of the removable plug 180. The tool interface 200 may be configured to receive a tool, such as a screw head, TORX® head, Allen head, bolt head, etc. The tool interface 200 may enable a hand tool or power tool to interface with the removable plug 180 when installing and/or removing the plug, such that the plug may be screwed in or out with the aid of the tool. The tool interface 200 may enable the removable plug 180 to be removed easily to quickly access the data port 140 when interfacing with the sensor board 146.

Figure 4:
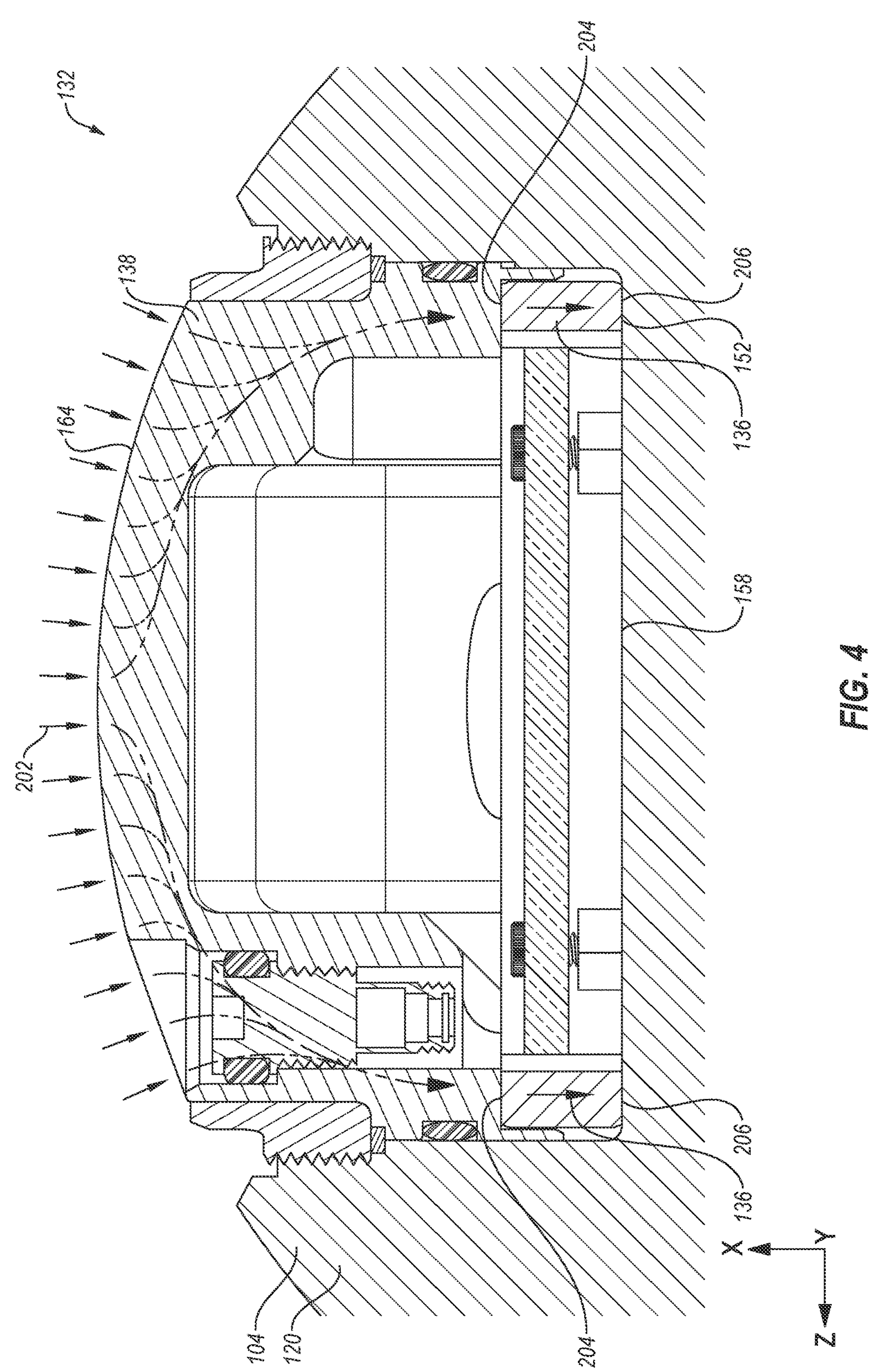
FIG. 4 is another cross-sectional view of the sensor apparatus of FIG. 2 in the assembled state showing external force (e.g., pressure) being applied to the sensor apparatus, in accordance with embodiments of the present disclosure.

FIG. 4 is another cross-sectional view of the sensor apparatus 132 in the assembled state showing external pressure 202 (e.g., downhole fluid pressure) applied to the sensor apparatus 132. In operation, drilling fluid circulates down into the wellbore 108 (FIG. 1) through the drill string 102 (FIG. 1), exits the drill string 102 (FIG. 1), and returns to the surface via the wellbore annulus surrounding the drill string 102 (FIG. 1). Meanwhile, the sensor apparatus 132 and the drill string component 104 (e.g., the downhole tool 120) is exposed to downhole conditions that may include high temperatures, high pressures, debris, and/or corrosive liquids. The wellbore pressure (e.g., downhole pressure or drilling fluid pressure) may be applied directly onto the exterior surface 164 of the cap 138 to generate the external pressure 202 (e.g., a distributed force) that results in a force that acts to seat (e.g., secure) the sensor structure 136 against base surface 166 of the recess 156 within the drill string component 104. For example, the exterior surface 164 of the cap 138 may be configured to receive the external pressure 202 that results in a force that transfers through the cap, through an interface 204 (e.g., a first interface) between the base surface 166 of the cap 138 and the second surface 154 of the sensor structure 136, and through the sensor structure 136 to a second interface 206 between the first surface 152 of the sensor structure and the interior surface 158 within the recess 156. Surface area and/or surface roughness at the interface 204 (e.g., the base surface 166 of the cap 138 and the second surface 154 of the sensor structure 136) may result in increased static friction (e.g., due to seizing). Similarly, surface area and/or surface roughness at the second interface 206 (e.g., first surface 152 of the sensor structure 136 and the interior surface 158 within the recess 156 of the drill string component 104) may result in increased static friction (e.g., due to seizing).

As shown simplistically in FIG. 4, the wellbore pressure may be substantially constant across the entire exterior surface 164 of the cap. Pressure is equal to a force applied divided by the area over which the force is applied, which is represented by the following equation:

$$\text{Pressure} = \frac{\text{Force}}{\text{Area}}$$

In systems with constant force, a change in the area over which the force is applied results in a corresponding change to the pressure applied (e.g., the contact pressure). For example, a decreased area results in a pressure (e.g., a contact pressure) decrease, and an increased area results in a pressure (e.g., a contact pressure) increase.

The exterior surface 164 of the cap may be configured to receive the external pressure 202 that results in a force that transfers through the cap 138 to an interface 204 defined by a contact area between at least a portion of the base surface 166 of the cap 138 and at least a portion of the second surface 154 of the sensor structure 136. In some embodiments, the contact area of the interface 204 may be defined by the smaller of the base surface 166 of the cap 138 and the second surface 154 of the sensor structure 136. For example, an entirety of the second surface 154 of the sensor structure 136 may contact at least a portion of the base surface 166 of the cap 138 such that the contact area of the interface 204 is the same as the area of the second surface 154 of the sensor structure 136. As another example, an entirety of the base surface 166 of the cap 138 may contact at least a portion of the second surface 154 of the sensor structure 136 such that the contact area of the interface 204 is the same as the area of the base surface 166 of the cap 138. In additional embodiments, the geometries of the cap 138 and the sensor structure 136 may result in only portions of the base surface 166 of the cap 138 in contact with only portions of the second surface 154 of the sensor structure 136.

The contact area of the interface 204 may be smaller than the exterior surface area of the exterior surface 164 of the cap 138. For example, the base surface 166 of the cap 138 may be smaller than the exterior surface 164 of the cap 138, and the base surface 166 of the cap 138 may be larger than the first surface 152 of the sensor structure 136. The force may be constant through the sensor apparatus 132, including the cap 138 and the sensor structure 136. Thus, the external pressure 202 applied to the exterior surface 164 of the cap 138 and the resulting force that transfers through the cap 138 results in an increase in contact pressure at the interface 204 because the contact area of the interface 204 is smaller than the exterior surface 164 of the cap 138.

In some embodiments, the exterior surface area of the cap 138 may be at least about 10% larger, about 20% larger, about 30% larger, about 40% larger, about 50% larger, about 60% larger, about 70% larger, about 80% larger, or about 90% larger than the contact area of the interface 204 and/or the first surface 152 of the sensor structure 136. As additional non-limiting examples, a ratio of the exterior surface area of the cap 138 to contact area of the interface 204 may be within a range of from about 2:1 to about 50:1, such as from about 3:1 to about 40:1, from about 4:1 to about 30:1, from about 5:1 to about 20:1, such as from about 6:1 to about 10:1 (e.g., about 8:1). As additional non-limiting examples, a ratio of the exterior surface area of the cap 138 to the first surface 152 of the sensor structure 136 may be within a range of from about 2:1 to about 50:1, such as from about 3:1 to about 40:1, from about 4:1 to about 30:1, from about 5:1 to about 20:1, such as from about 6:1 to about 10:1 (e.g., about 8:1).

In addition, the resulting force from the external pressure 202 applied to the exterior surface 164 of the cap 138 may transfer from the interface 204 between the base surface 166 of the cap 138 and the second surface 154 of the sensor structure 136, through the sensor structure 136 to a second interface 206 between the first surface 152 of the sensor structure and the interior surface 158 within the recess 156. The second interface 206 is defined by a contact area between at least a portion of the first surface 152 of the sensor structure 136 and at least a portion of the interior surface 158 of the drill string component 104 within the recess 156. In some embodiments, the contact area of the second interface 206 may be defined by the smaller of the first surface 152 of the sensor structure 136 and the interior surface 158 within the recess 156. For example, an entirety of the first surface 152 of the sensor structure 136 may contact at least a portion of the interior surface 158 within the recess 156 such that the contact area of the second interface 206 is the same as the area of the first surface 152 of the sensor structure 136. As another example, an entirety of the interior surface 158 of the drill string component 104 within the recess 156 may contact at least a portion of the first surface 152 of the sensor structure 136 such that the contact area of the interface 204 is the same as the area of the interior surface 158 within the recess 156. In additional embodiments, the geometries of the interior surface 158 within the recess 156 and the sensor structure 136 may result in only portions of the interior surface 158 within the recess 156 in contact with only portions of the first surface 152 of the sensor structure 136.

The contact area of the second interface 206 may be smaller than the exterior surface area of the exterior surface 164 of the cap 138. The contact area of the second interface 206 may also be larger, substantially the same size, or smaller than the contact area of the interface 204 between the cap 138 and the sensor structure 136. As shown in FIG. 4, the contact area of the second interface 206 is substantially the same as the contact area of the interface 204. As previously mentioned, the force may be constant through the sensor apparatus 132, including the cap 138 and the sensor structure 136. Thus, the resulting force from the external pressure 202 applied to the exterior surface 164 of the cap 138 results in an increase in contact pressure at the interface 204. The force remains constant through the sensor structure 136. Thus, the contact pressure at the second interface 206 may be higher than the contact pressure at the interface 204 because the contact area of the second interface 206 is smaller than the contact area of the interface 204. Accordingly, the contact pressure at the second interface 206 may be higher than both the contact pressure at the interface 204 and also higher than the pressure (e.g., the drilling fluid pressure) applied to the exterior surface 164 of the cap 138.

In some embodiments, the contact area of the second interface 206 is larger than the contact area of the interface 204 such that the contact pressure at the second interface 206 is lower than the contact pressure at the interface 204. For example, a portion of the sensor structure 136 proximate the first surface 152 may be chamfered, beveled, and/or rounded. In some embodiments, the drill string component 104 within the recess 156 may include a corresponding chamfered, rounded, and/or beveled surface that is complementary to the chamfered, rounded, and/or beveled portion of the sensor structure 136. In such embodiments, the second interface 206 is defined by the contact area between at least a portion of the first surface 152 of the sensor structure 136 and at least a portion of the interior surface 158 within the recess 156. In additional embodiments, the recess 156 within the drill string component 104 may include a corresponding chamfered, rounded, and/or beveled edge upon which the chamfered, rounded and/or beveled portion of the sensor structure 136 rests. In such embodiments, the second interface 206 is at least partially defined by the contact area between at least portions of the chamfered, rounded, and/or beveled surface of the sensor structure 136 and corresponding chamfered, rounded, and/or beveled surface of the drill string component 104 within the recess 156. The second interface 206 is also at least partially defined by the contact area between at least a portion of the first surface 152 of the sensor structure 136 and at least a portion of the interior surface 158 within the recess 156. In circumstances in which the contact area of the second interface 206 is larger than the contact area of the interface 204, the resultant contact pressure may be reduced, but the chamfered, beveled, and/or rounded surfaces may function as wedges that create additional static friction between the sensor structure 136 and surfaces within the recess 156. For example, the surfaces may include rough textures (e.g., ridges, ribs, waveforms, bubbles, honeycombs, lattices, or other textures) and/or high surface roughness (e.g., greater than about 0.25 arithmetic average (Ra), measured in Microns (μm) that further increases static friction). Thus, the sensor structure 136 and/or the sensors 122 may still be effectively secured to the drill string component 104 and may be capable of measuring internal forces affected the drill string component 104.

In additional embodiments, the contact area of the second interface 206 is smaller than the contact area of the interface 204. Accordingly, a constant force (e.g., resulting from the external pressure 202) transferred through the sensor structure may result in a higher contact pressure at the second interface 206 compared to the contact pressure at the interface 204. In some embodiments, the contact area of the interface 204 may be larger than the contact area of the second interface 206. For example, the contact area of the interface 204 may be at least about 10% larger, about 20% larger, about 30% larger, about 40% larger, about 50% larger, about 60% larger, about 70% larger, about 80% larger, or about 90% larger than the contact area of the second interface 206. As additional non-limiting examples, a ratio of the contact area of the second interface 206 to the contact area of the second interface 206 may be within a range of from about 2:1 to about 50:1, such as from about 3:1 to about 40:1, from about 4:1 to about 30:1, from about 5:1 to about 20:1, such as from about 6:1 to about 10:1 (e.g., about 8:1).

The contact area of the second interface 206 being smaller than the contact area of the interface 204 may further secure the first surface 152 of the sensor structure 136 against the interior surface 158 within the recess 156, which increases static friction between the first surface 152 and the interior surface 158 (e.g., due to seizing). Therefore, the sensor structure 136 may be less likely to move (e.g., rotate) and forces within the drill string component 104 may be accurately measured by the sensors 126. For example, the first sensor 148 and the second sensor 150 of sensor structure 136, and optionally additional sensors 126 of the sensor board 146 and/or the sensor structure 136, may be configured to detect (e.g., measure) forces within the drill string component 104. The forces may be applied to the drill string component 104 and resulting forces may be applied to sensor structure 136. In addition, a sensor 126 (e.g., the first sensor 148) may extend along an interior sidewall of the sensor structure 136 from the first surface 152 to the second surface 154.

The first sensor 148 may be configured to detect a threshold force within the sensor structure 136 at which the sensor structure essentially forms a unitary part of the drill string component 104 (e.g., the downhole tool 120) such that the sensors 126 may accurately detect (e.g., measure) drilling parameters related to the drilling operation and/or the drill string component 104. In other words, the combination of the force applied to the sensor structure 136 and the resulting contact pressure at the second interface 206, the surface texture, and/or the surface roughness results in enough static friction between the first surface 152 and the interior surface 158 within the recess 156 such that forces within the drill string component 104 no longer move the sensor structure 136 and/or the sensors 126 (e.g., due to material seizing). Accordingly, the sensors 126 can accurately detect (e.g., measure) forces affecting the drill string component 104 because the forces within the drill string component 104 no longer move (e.g., translate, rotate) the sensors 126. The threshold force may be a value of about 3,000 Newtons (N). For example, in embodiments of the disclosure, a compressive force of about 3,000 N of greater applied to the first surface 152 of the sensor structure 136 may facilitate more accurate measurements from the sensors 126.

At least a portion of the base surface 166 of the cap 138, the first surface 152 of the sensor structure 136, the second surface 154 of the sensor structure 136, and/or the interior surface 158 within the recess 156 may include surface features to further increase friction at the interface 204 and/or the second interface 206. The surface features may include rough surface textures (e.g., ridges, ribs, waveforms, bubbles, honeycombs, lattices, or other textures). The surface features may also include high surface roughness (e.g., greater than about 0.25 arithmetic average (Ra)), measured in Microns (μm), such as from about 0.25 Ra (Micron) to about 1.5 Ra (μm), such as from about 0.5 Ra (μm) to about 1 Ra (μm) (e.g., about 0.75 Ra (μm)). Rough surface textures may further increase friction between the base surface 166 of the cap 138 and the second surface 154 of the sensor structure 136 at the interface 204, and may further lead to seizing. In addition, rough surface textures may further increase friction at the second interface 206 between the first surface 152 of the sensor structure 136 and the interior surface 158 within the recess 156 of the drill string component 104, and may further lead to seizing.

Figures 5, 6:
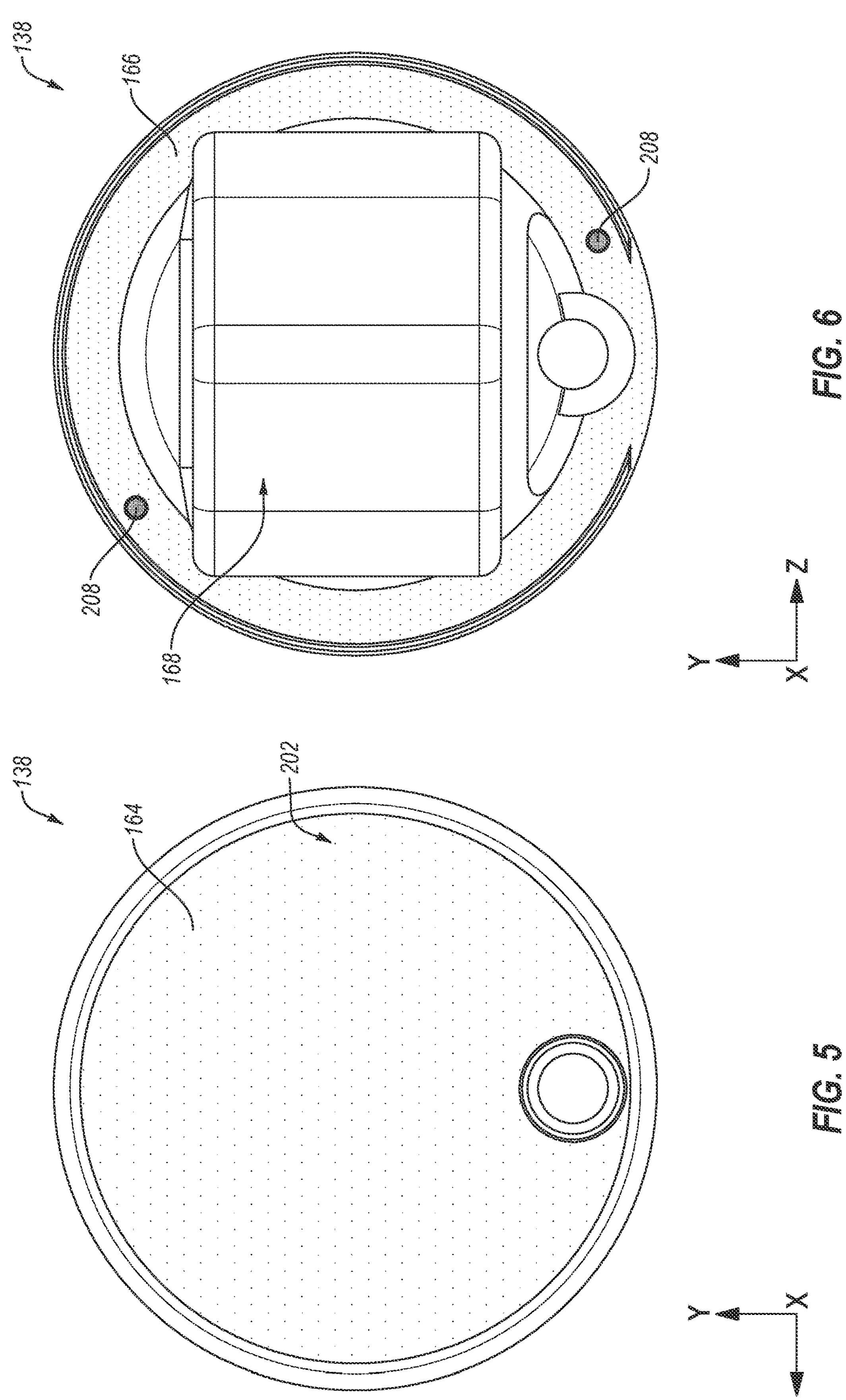
FIGS. 5 and 6 are top and bottom views, respectively, of a cap of the sensor apparatus of FIG. 2 showing external force (e.g., pressure) being applied to the top surface of the cap, and resultant force (e.g., pressure) at the bottom surface of the cap, in accordance with embodiments of the present disclosure.

FIGS. 5 and 6 are top and bottom views, respectively, of the cap 138 of the sensor apparatus 132. FIGS. 5 and 6 include gradients that represent pressure applied to the respective surfaces of the cap 138 when the sensor apparatus 132 is in the assembled state (FIG. 4). The amount of the stippling per unit area (e.g., the stippling density) corresponds to the contact pressure at the respective surfaces due to the external pressure 202 applied to the exterior surface 164 of the cap 138. For example, the lower density stippling shown on the exterior surface 164 of the cap 138 in FIG. 5 represents lower contact pressure, and a higher density stippling on the base surface 166 of the cap in FIG. 6 represents higher contact pressure.

As shown in FIG. 5, the exterior surface 164 of the cap 138 exhibits a generally domed circular shape. The area of the exterior surface 164 of the cap 138 is relatively large compared to the total surface area of the cap 138, and compared to the size of the base surface 166 of the cap 138 shown in FIG. 6. When the sensor apparatus 132 is in the assembled state, the external pressure 202 (e.g., the downhole fluid pressure) may be applied across the entirety of the exterior surface 164 of the cap 138. The external pressure 202 applied to the exterior surface 164 of the cap 138 results in a force that transfers through the cap 138 to the interface 204 (FIG. 4), the contact area of which may be the same as, or different than the base surface 166 of the cap 138.

Referring now to FIG. 6, sidewalls of the cap 138 define the interior cavity 168 such that the base surface 166 of the cap 138 exhibits a generally annular shape. In addition, the cap 138 includes openings 208 that may be threaded and may be used to secure the cap 138 to the sensor structure 136.

Figures 7, 8:
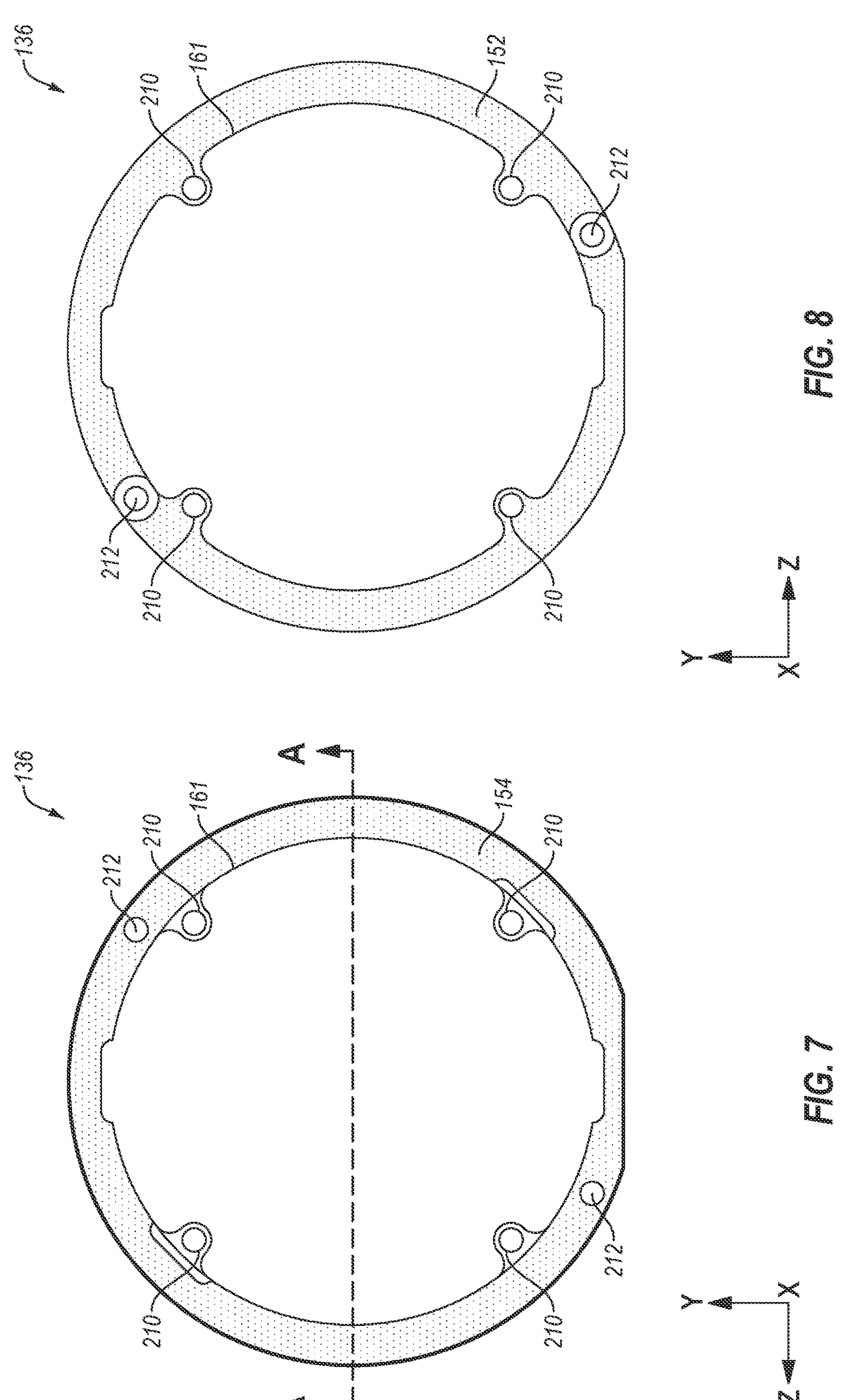
FIGS. 7 and 8 are top and bottom views, respectively, of a sensor structure of the sensor apparatus of FIG. 2 showing resultant force (e.g., pressure) at the top and bottom surfaces of the sensor structure, in accordance with embodiments of the present disclosure.

The area of the base surface 166 is relatively small compared to the surface area of the exterior surface 164 of the cap 138. Additionally, as shown in FIGS. 6 and 7 (described below), the base surface 166 of the cap 138 is larger than the second surface 154 of the sensor structure 136, so the contact area of the interface 204 (FIG. 4) may be the same as the second surface 154 of the sensor structure 136. Accordingly, only a portion of the base surface 166 of the cap 138 may be in contact with the second surface 154 of the sensor structure 136. As shown in FIG. 6, the gradient on the base surface 166 may represent the resultant force from the external pressure 202 that is distributed across the base surface 166 of the cap 138 (e.g., the contact pressure at the base surface 166 of the cap 138). The magnitude of the contact pressure at the base surface 166 of the cap 138 is greater than the pressure at the exterior surface 164 of the cap 138, which is shown by a greater stippling density than in of FIG. 5.

FIGS. 7 and 8 are top and bottom views, respectively, of the sensor structure 136 of the sensor apparatus 132. FIGS. 7 and 8 include gradients that represent pressure applied to the respective surfaces of the sensor structure 136 when the sensor apparatus 132 is in the assembled state (FIG. 4). The darkness of the gradient corresponds to the contact pressure at the respective surfaces due to the magnitude of the force resulting from the external pressure 202 applied to the exterior surface 164 of the cap 138. For example, the relatively dense stippling shown on the second surface 154 of the sensor structure 136 in FIG. 7 represents higher contact pressure relative to the pressure on the exterior surface 164 of the cap 138. Similarly, the relatively dense stippling on the first surface 152 of the sensor structure 136 in FIG. 8 represents a higher contact pressure relative to the external pressure 202 on the exterior surface 164 of the cap 138.

Referring collectively to FIGS. 7 and 8, the sensor structure 136 may be configured to secure the sensor board 146 within the sidewall 161 of the sensor structure 136. For example, the sensor structure 136 may include securing features 210 that may be used to secure the sensor board 146 to the sensor structure 136 in a specific orientation. For example, the securing features 210 may include one or more threaded openings (e.g., apertures, pockets, recesses, etc.) configured to receive threaded fasteners. The threaded fasteners may be configured to secure the sensor board 146 to the sensor structure 136 within the threaded openings. In some embodiments, the securing features 210 may include one or more pins or ridges and/or corresponding (e.g., complementary) recesses or grooves.

In some embodiments, the sensor structure 136 may include one or more openings 212 (e.g., an aperture, pocket, recess, etc.) that may be located within the second surface 154 and/or extending through the sensor structure 136 to the first surface 152. In some embodiments, the openings 212 may be configured to be an additional alignment feature. For example, the openings 212 may be configured to receive a pin protruding from the drill string component 104. In some embodiments, the openings 212 may configured to secure the sensor structure 136 to the cap 138 via fasteners and the openings 208 of the cap 138 (shown in FIG. 6) such that the second surface 154 of the sensor structure 136 maintains contact with the base surface 166 of the cap 138. For example, the sensor structure 136 may be positioned relative to the cap 138 such that the openings 212 of the sensor structure 136 are aligned with the openings 208 of the cap 138 (shown in FIG. 6), and then a fastener may be positioned through the openings 212 and secured within (e.g., threaded into) the openings 208 of the cap 138.

Referring now to FIG. 7, the second surface 154 of the sensor structure 136 exhibits a generally annular shape. The area of the second surface 154 of the sensor structure 136 is relatively small compared to the area of the exterior surface 164 of the cap 138, and may be about the same size as the base surface 166 of the cap 138 shown in FIG. 6. When the sensor apparatus 132 is in the assembled state, the external pressure 202 (e.g., the downhole fluid pressure) may be applied across the entirety of the exterior surface 164 of the cap 138. The external pressure 202 applied to the exterior surface 164 of the cap 138 results in a force that transfers through the cap 138 to the interface 204 (FIG. 4), the contact area of which may be the same as, or different than the second surface 154 of the sensor structure 136. As shown in FIGS. 6 and 7, the base surface 166 of the cap 138 is larger than the second surface 154 of the sensor structure 136, so the contact area of the interface 204 (FIG. 4) is the same size as the second surface 154 of the sensor structure 136. As shown in FIG. 7, the stippling density on the second surface 154 of the sensor structure 136 may represent the resultant force from the external pressure 202 distributed across the second surface 154 of the sensor structure 136 (e.g., the contact pressure at the second surface 154). The contact pressure at the second surface 154 of the sensor structure 136 is greater than the external pressure 202 applied to the exterior surface 164 of the cap 138, and greater the contact pressure shown on the base surface 166 of the cap 138 in FIG. 6, which is shown by denser stippling than that of FIG. 5, and slightly denser stippling than that of FIG. 6.

Referring now to FIG. 8, first surface 152 of the sensor structure 136 exhibits a generally annular shape. The area of the first surface 152 of the sensor structure 136 is relatively small compared to the surface area of the exterior surface of cap 138, and may be the same as, or different than the second surface 154 of the sensor structure 136. At least a portion of the first surface 152 of the sensor structure 136 may be in contact with the interior surface 158 of the drill string component 104 within the recess 156 (FIG. 4), so the contact area of the second interface 206 may be the same as the surface area of the first surface 152 of the sensor structure 136. In addition, the stippling on the first surface 152 may represent the contact pressure at the interface 204 (FIG. 4) between the first surface 152 of the sensor structure 136 and the interior surface 158 within the recess 156. As shown in FIG. 6, the contact pressure at the first surface 152 of the sensor structure 136 may be substantially the same as the contact pressure at the second surface 154 of the sensor structure 136, which is shown by the stippling density being the same as that of FIG. 7. However, in certain embodiments, the first surface 152 may exhibit a smaller area than the second surface 154 of the sensor structure 136 such that contact pressure at the first surface 152 is larger than the contact pressure at the second surface 154.

Figures 9, 10:
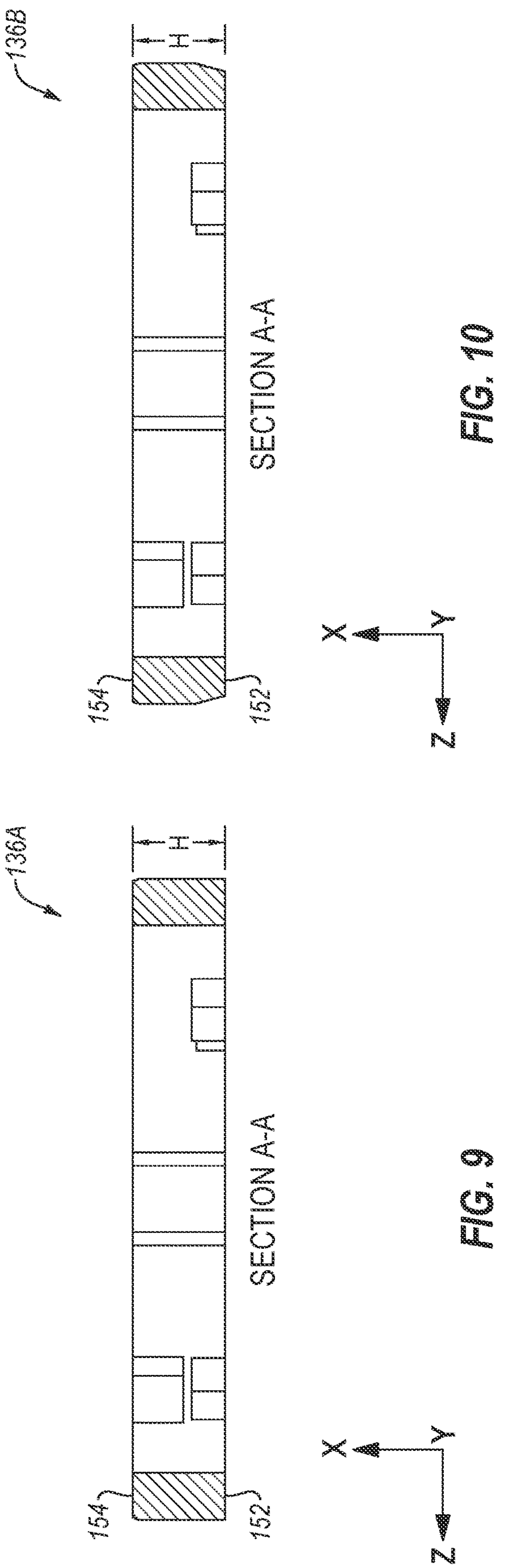
FIGS. 9 and 10 are cross-sectional views of embodiments of the sensor structure of FIGS. 7 and 8 taken along the plane illustrated by the A-A section line of FIG. 7, in accordance with the present disclosure.

To show the differences between the first surface 152 and the second surface 154 of the sensor structure 136, FIGS. 9 and 10 show cross-sectional views of the sensor structure 136 taken in the X-Z plane about section line A-A.

Referring now to FIG. 9, in some embodiments, the sensor structure 136A may exhibit uniform geometry in the X-Z plane along a height (H) of the sensor structure 136A defined by a distance from the first surface 152 to the second surface 154, as shown by the sensor structure 136A of FIG. 9. Accordingly, the sensor structure 136A may exhibit a substantially uniform cross-sectional area (e.g., in the X-Z) plane.

In additional embodiments, such as that shown in FIG. 10, the sensor structure 136B may exhibit non-uniform geometry in the X-Z plane along a height (H) of the sensor structure 136B defined by a distance from the first surface 152 to the second surface 154, as shown in FIG. 10. The sensor structure 136B exhibiting non-uniform thickness along the height (H). More specifically, portions of the sensor structure 136B proximate the first surface 152 are chamfered. Accordingly, the first surface 152 of the sensor structure 136B is smaller than the second surface 154 of the sensor structure 136B. While illustrated as a chamfer, portions of the sensor structure 136B proximate the first surface 152 may be may be rounded, beveled, etc. Accordingly, the surface area of the first surface 152 may be smaller than the second surface 154 by the presence of the chamfer, bevel, and/or rounded edge.

In some embodiments, the recess 156 (FIG. 4) within the drill string component 104 does not include a corresponding chamfered, rounded, and/or beveled surface complementary to the chamfered, rounded, and/or beveled portion of the sensor structure 136B. In such embodiments, the second interface 206 (FIG. 4) is defined by the contact area between at least a portion of the first surface 152 of the sensor structure 136B and at least a portion of the interior surface 158 within the recess 156.

In additional embodiments, the recess 156 (FIG. 4) within the drill string component 104 may include a corresponding chamfered, rounded, and/or beveled edge upon which the chamfered, rounded and/or beveled portion of the sensor structure 136B rests. In such embodiments, the second interface 206 (FIG. 4) is at least partially defined by the contact area between at least portions of the chamfered, rounded, and/or beveled surface of the sensor structure 136B and corresponding chamfered, rounded, and/or beveled surface of the drill string component 104 within the recess 156. The second interface 206 (FIG. 4) is also at least partially defined by the contact area between at least a portion of the first surface 152 of the sensor structure 136B and at least a portion of the interior surface 158 within the recess 156.

Figure 11:
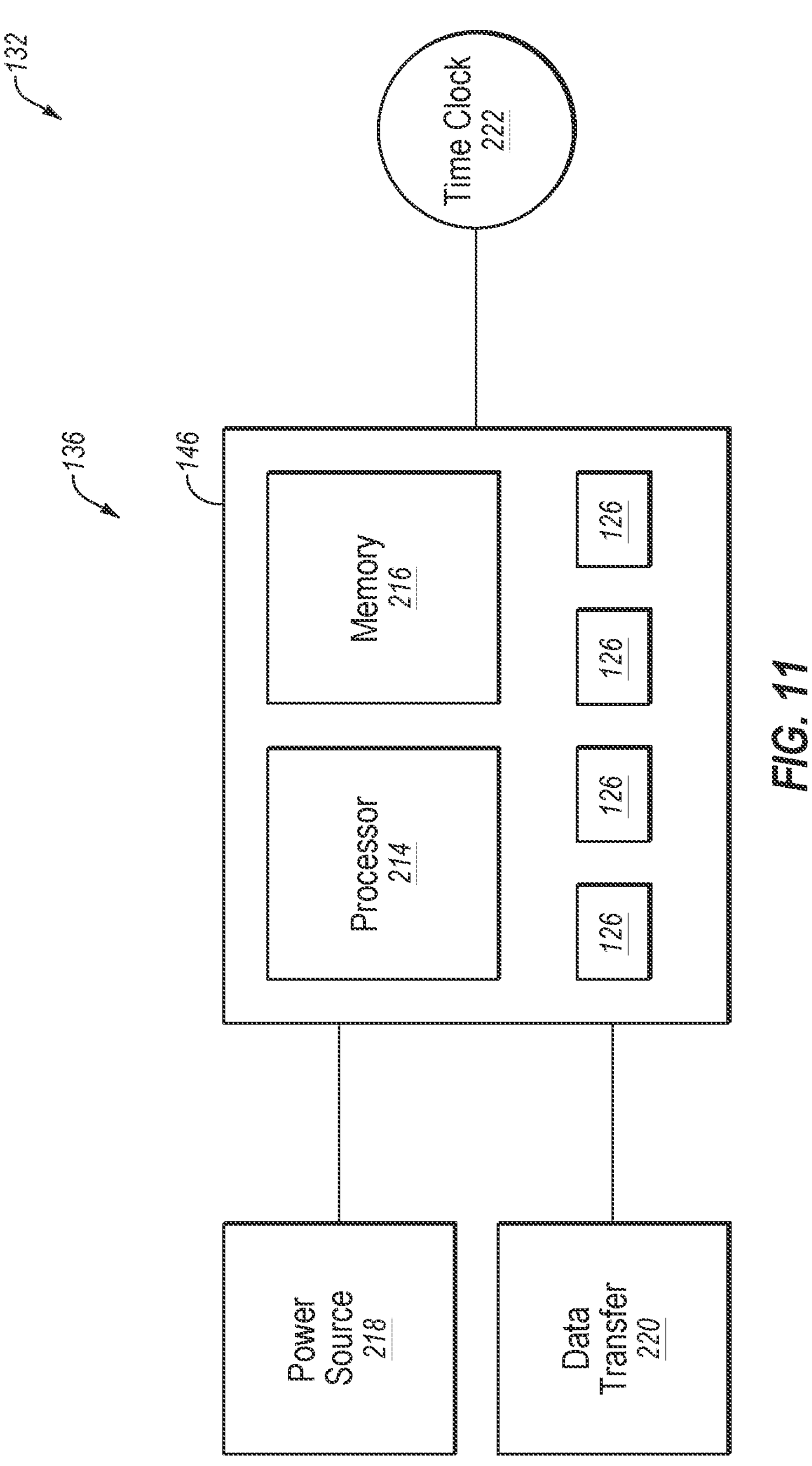
FIG. 11 is a schematic view of the electronics of the sensor apparatus of FIG. 2, in accordance with embodiments of the present disclosure.

FIG. 11 illustrates a schematic view of electronic components of the sensor apparatus 132. For example, FIG. 11 may show electronic components of the sensor structure 136 (e.g., the sensor board 146).

The sensor structure 136 may include a processor 214 and a memory storage device 216. The memory storage device 216 may be configured to store instructions for the processor 214. In some embodiments, the memory storage device 216 may be configured to store readings from sensors the 126 coupled to the sensor structure 136 and/or the sensor board 146.

In some embodiments, the processor 214 may be configured to control features of the sensor board 146, such as sampling rates, starting and/or stopping data recording; transmitting and/or receiving data and or instructions, etc. For example, the processor 214 may start recording data once the processor 214 determines that the sensor board 146 and the associated drill string components 104 are downhole. The processor 214 may periodically collect data from the sensors 126 of the sensor board 146. When the sensors 126 return values that coincide with downhole conditions, the processor 214 may determine that the sensor structure 136 and the associated drill string component 104 are downhole and begin recording data from the sensors 126.

In some embodiments, the processor 214 may be configured to perform calculations with the raw sensor data provided by the sensors 126. For example, the processor may collect data from one or more accelerometers and determine operational parameters of the drill string component 104 such as rotational speed, bit direction, tilt, azimuth, etc., as described in, for example, U.S. patent application Ser. No. 16/945,471 to Evans et al. (Jul. 31, 2000), the disclosure of which was previously incorporated herein by reference. In some embodiments, the processor 214 may calculate downhole properties and/or tool properties from sensors configured to measure mechanical properties of the sensor structure 136, such as sensor 126 described above. In some embodiments, the processor 214 may control transfer and storage of the raw sensor data such as organizing the raw sensor data into arrays, databases, etc., in a manner to provide the raw sensor data to a separate processor and/or computing device for performing the calculations and conversions.

The sensor board 146 may be coupled to a power source 218, such as the power storage device 174. The power source 218 may be configured to power the sensor board 146, the processor 214, the sensors 126, and/or any other components coupled directly or indirectly to the sensor board 146. In some embodiments, the power source 218 may be an external power source, such that the power source 218 is not directly attached to the sensor board 146. For example, the power source 218 may be located in the cap 138 as described above, and electrically coupled to the sensor board 146 through wiring. In some embodiments, the power source 218 may be directly coupled to the sensor board 146. For example, the power source 218 may be a component directly soldered to the sensor board 146. In some embodiments, the sensor board 146 may include a battery receptacle directly coupled to the sensor board 146. The battery receptacle may be configured to receive a battery, such as a button cell battery, to act as the power source 218.

The sensor board 146 may be coupled to a data transfer device 220, such as the data port 140, transmitter, receiver, etc., as described above. The data transfer device 220 may be configured to transfer data from and/or to the sensor board 146. For example, the data transfer device 220 may be configured to transfer sensor data from the sensor board 146 to another drill string component 104. In some embodiments, the data transfer device 220 may be configured to transfer sensor data to a computing device separate from the drill string. In some embodiments, the data transfer device 220 may be configured to receive sensor data from one or more drill string components 104. In some embodiments, the data transfer device 220 may be configured to receive data from an external computer, such as set-up data, firmware updates, programming updates, sensor configurations, etc.

In some embodiments, the data transfer device 220 may be an external device configured to couple to the sensor board 146 through a wired or terminal connection. For example, as described above with respect to FIGS. 2 and 3, the data port 140 may be coupled to the sensor board 146 through the cap 138. In some embodiments, the data transfer device 220 may be coupled directly to the sensor board 146. For example, the data transfer device 220 may be a transmitter and/or receiver positioned on the sensor board 146. The transmitter and/or receiver may be configured to transmit and/or receive signals, such as radio frequency signals, through the cap 138. For example, the cap 138 may include a radio frequency transparent portion (e.g., the communication feature 178, an RF transparent cap, an RF window, etc.), as described above with respect to FIGS. 2 and 3.

The sensor board 146 may include a timing device 222, such as a time clock. In some embodiments, the timing device 222 may be configured to provide triggers to the processor 214. The processor 214 may be configured to execute specific commands on different triggers. For example, before the processor 214 has begun recording data, the processor 214 may be configured to monitor specific sensors 126 at longer time intervals to determine if the sensor board 146 and the associated drill string component 104 is downhole. The longer time intervals may be provided by a trigger from the timing device 222. In some embodiments, when the processor 214 is recording data, some sensor measurements may need to be coordinated. For example, some sensor measurements may need to be measured at substantially the same time to facilitate calculations using sensor measurements from more than one sensor 126. The timing device 222 may provide a trigger to the processor 214 such that the measurements may be taken from each of the associated sensors 126 when the trigger from the timing device 222 is received by the processor 214.

In some embodiments, the timing device 222 may be directly coupled to the sensor board 146. For example, the timing device 222 may be a component soldered directly to the sensor board 146. In some embodiments, the timing device 222 may be a remote device electrically coupled to the sensor board 146 through wiring or terminals. In some embodiments, the timing device 222 may be integrated into the processor 214 (e.g., embedded in the processor 214).

Figure 12:
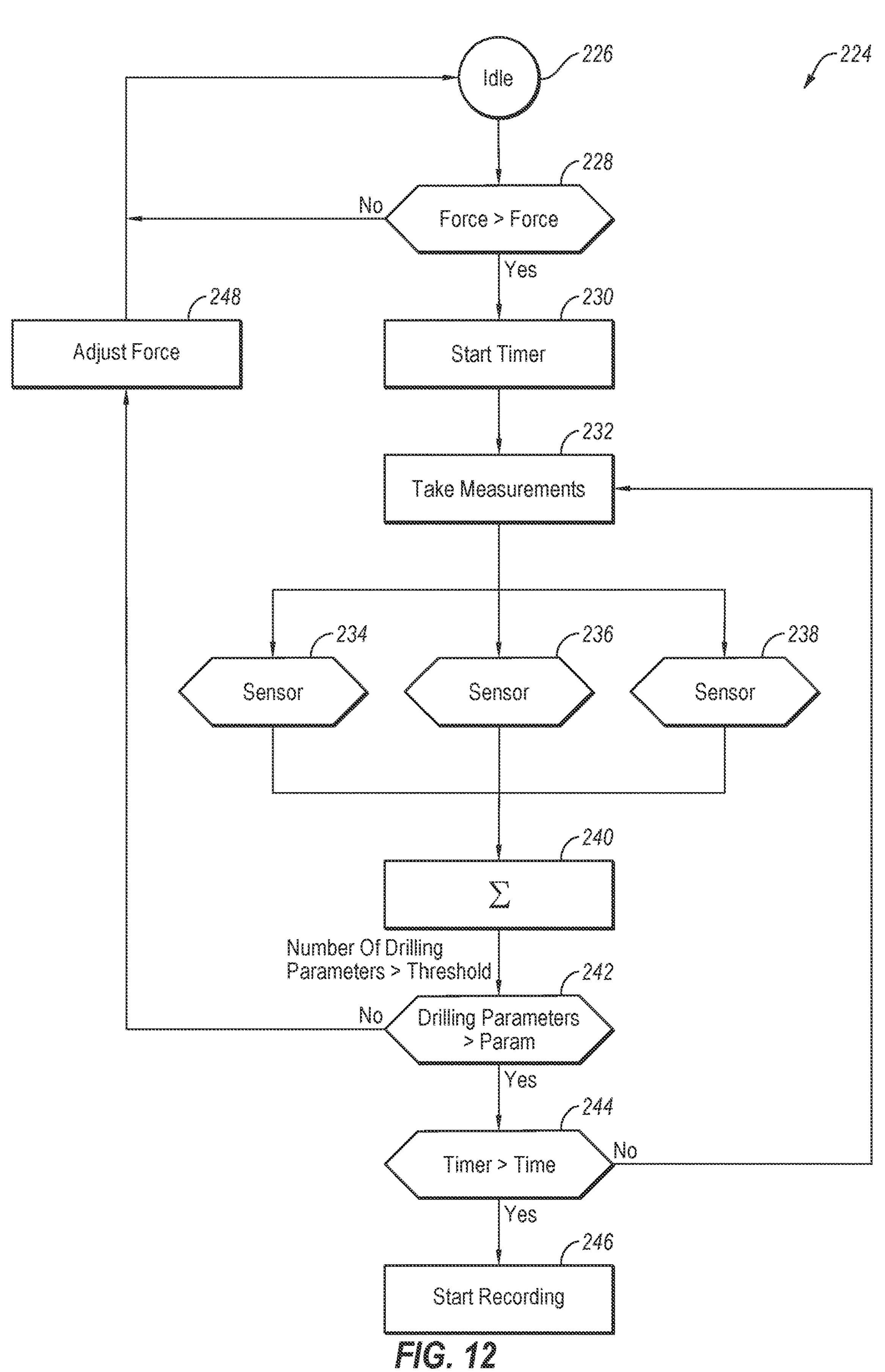
FIG. 12 is a flow diagram of a method of operating the sensor apparatus of FIG. 2, in accordance with embodiments of the present disclosure.

FIG. 12 illustrates a method 224 of operating the sensor apparatus 132 for the drill string component 104. The method 224 may be configured to enable the sensor board 146 to conserve power when the sensor apparatus 132 is not in an area of interest, such as downhole. For example, the method 224 may substantially prevent the sensor apparatus 132 from data logging and capturing significant amounts of data when the sensor apparatus 132 (including the sensor structure 136 and the sensor board 146) and drill string component 104 are in storage, in transit to a drilling site, and/or being coupled to a drill string. Conserving power may enable the sensor board 146 to include a smaller power source 218 and/or extend a service life of the sensor apparatus 132.

The sensor apparatus 132 (e.g., the sensor board 146) may be maintained in an idle mode, as illustrated in act 226. In the idle mode, the processor 214 may operate in a sleep or low power mode. In the sleep or low power mode, the processor 214 may only monitor a small number of the sensors 126 (e.g., a force sensor, pressure sensor, and/or torque sensor on the sensor structure 136) and may not perform any calculations with the sensor data from the sensors 126.

In some embodiments, when one of the sensors 126 of the sensor apparatus 132 detects a non-zero value, or a value above a given threshold, a trigger may begin a start-up sequence in the processor 214 in act 228. For example, a force sensor on the sensor structure 136 detects a force (corresponding to a force being applied to the first surface 152 of the sensor structure 136) on the sensor apparatus 132, a trigger may begin the start-up sequence in the processor 214. In some embodiments, the force sensor on the sensor structure 136 detecting any amount of force may trigger the start-up sequence. In additional embodiments, the start-up sequence may trigger in response to the force sensor on the sensor structure 136 detecting a force at about or greater than a threshold force. For example, the force sensor on the sensor structure 136 may detect a force at about or greater than the threshold force when the sensor apparatus 132 is positioned within the recess 156 of the drill string component 104 and the cap 138 is secured into position via the locking ring 142. As another non-limiting example, the force sensor on the sensor structure 136 may detect a force at about or greater than the threshold force (e.g., about 3,000 N) in response to wellbore pressure (e.g., drilling fluid pressure or downhole pressure) applied to the exterior surface 164 of the cap 138 by drilling fluid circulating through the wellbore during drilling operations. The external force (e.g., drilling fluid pressure) applied on the exterior surface 164 of the cap 138 may transfer through the sensor apparatus 132 to secure the first surface 152 (e.g., base surface) of the sensor structure 136 to the drill string component 104 within the recess 156. As previously discussed, the exterior surface 164 of the cap 138 may be larger than the first surface 152 of the sensor structure 136 to amplify the contact pressure and secure the sensor structure 136 to the drill string component 104.

In some embodiments, the one or more sensors 126 may begin the start-up sequence through a switch. For example, when the force sensor detects a force applied to the sensor apparatus 132 (e.g., to the first surface 152 of the sensor structure 136), the force sensor may engage a switch, such as a relay, limit switch, etc., that may switch based on the output of the strain gauge without processing the output of the strain gauge. The switch may then begin the start-up sequence of the processor 214. In some embodiments, other types of sensors may trigger the start-up sequence. For example, an accelerometer, a pressure sensor, temperature sensor, gyroscope, gyrometer, magnetometer, etc., may be used to trigger the start-up sequence.

The trigger may start the timing device 222 in act 230. The timing device 222 may be configured to provide a trigger to the processor 214 at a time interval. In some embodiments, the time interval may be between about 15 seconds and about 1 hour, such as between about 1 minute and about 30 minutes or about 15 minutes.

The trigger from the timing device 222 may cause the processor 214 to take measurements from one or more of the sensors 126 in act 232. For example, the processor 214 may begin to record (e.g., store) drilling parameters detected by the sensors 126. As previously discussed, drilling parameters may include the downhole conditions (e.g., temperature, pressure (e.g., downhole drilling fluid pressure, formation pressure, etc.), vibration, fluid density, fluid viscosity, cutting density, cutting size, cutting concentration), formation information, (e.g., formation composition, formation density, and/or formation geometry), drill string component information (e.g., temperature, axial and/or radial forces on the drill string component 104), torque on the drill string component 104 (e.g., about the central longitudinal axis 144 of the drill string component 104).

The measurements may correspond to features that are determined to indicate whether the sensor apparatus 132 and associated drill string component 104 are located downhole. For example, as discussed above, the sensors 126 may include temperature sensors, force sensors, pressure sensors, torque sensors, accelerometers, gyroscopes, gyrometers, magnetometers, etc. In some embodiments, the processor 214 may be configured to take measurements from between about one sensor 126 and about ten sensors 126, such as between about two sensors 126 and about five sensors 126, or about three sensors 126.

Once the processor 214 takes the measurements from the sensors 126 in act 232, the processor 214 may calculate one or more additional drilling parameters (e.g., downhole indicators) from the measurements in acts 234, 236, and 238. The calculated drilling parameters (e.g., downhole indicators) may include rotational speed (RPM) of the drill string component 104, the drilling fluid pressure at the drill string component, and/or the fluid flow rate at the drill string component 104. The calculated drilling parameters may additionally include information specifically related to the earth-boring tool 110 (e.g., tool temperature, cutter temperature, cutter wear, weight on bit (WOB), torque on bit (TOB), string rotational speed (RPM), drilling fluid pressure at the earth-boring tool 110, and/or fluid flow rate at the earth-boring tool 110).

As shown in FIG. 11, the processor 214 may calculate a rotational speed in act 234, a downhole temperature in act 236, and a wellbore pressure (e.g., drilling fluid pressure or downhole pressure) in act 238. In some embodiments, the processor 214 may calculate other drilling parameters (e.g., downhole indicators), such as a standard deviation of force, torque, acceleration, a standard deviation of rotational velocity, an acceleration pattern, a force pattern, a torque pattern, a vibration, an inclination, azimuth, etc. The processor 214 may calculate between about one drilling parameter and about ten drilling parameters, such as between about two drilling parameters and about four drilling parameters, or about three drilling parameters.

The processor 214 may determine which of the drilling parameters calculated in acts 234, 236, and 238 are above associated threshold values in act 240. The threshold values for each of the drilling parameters may be values that are expected in a downhole environment that are not common values outside of a downhole environment. The processor 214 may add the number of drilling parameters that exceed the threshold values.

The processor 214 may then compare the number of drilling parameters that exceed the threshold values to the total number of drilling parameters calculated in act 242. If the number of drilling parameters that exceed the threshold values is less than the number of calculated drilling parameters, the force trigger may be reset in act 248 and the processor may return to the idle mode in act 226. In some instances, one or more of the drilling parameters may be above the threshold values while other values are not. For example, if the drill string component 104 is left in the sun the temperature measurement may be above the threshold value while a pressure measurement may remain below the threshold value and the rotational speed may be substantially zero.

If all of the calculated drilling parameters exceed the threshold values, the measurements may be retaken at act 244 for a threshold amount of time. The threshold amount of time may be between about 10 seconds and about 1 minute, such as about 30 seconds. If one or more of the calculated drilling parameters drop below the threshold values during the threshold amount of time, the force trigger may be reset in act 248 and the processor may return to the idle mode in act 226. If all of the calculated drilling parameters exceed the threshold values for the threshold amount of time, the processor 214 may begin operating in a normal operating condition and begin recording sensor values in act 246.

In some embodiments, different weights may be applied to different drilling parameters. For example, some drilling parameters, such as rotational speed or pressure may be less likely to exceed the threshold values when the downhole tool is not located downhole. In some embodiments, if a higher weighted downhole indicator(s) exceed the threshold value the measurements may be retaken at act 244 for the threshold amount of time. If the higher weighted downhole indicator(s) drop below the threshold value during the threshold amount of time, the force trigger may be reset in act 248 and the processor may return to the idle mode in act 226. If the higher weighted downhole indicator(s) exceed the threshold value for the threshold amount of time, the processor 214 may begin operating in a normal operating condition and begin recording sensor values in act 246.

Embodiments of the present disclosure may facilitate more accurate data gathering during drilling operations than with conventional systems. For example, utilizing downhole drilling fluid pressure and different surface areas may result in increased contact pressure between a drill string component and a sensor apparatus within the drill string component. The increased contact pressure may merge the sensors of the sensor apparatus with the drill string component. As a result, changes in drilling parameters (e.g., forces, pressures) affecting drill string components may be more accurately captured by the sensors of the sensor apparatus. More accurate data gathering may enhance decision making and improve longevity of drill string components during drilling operations.

In addition, embodiments of the present disclosure may enable data to be captured from an electrically isolated sensor apparatus installed on downhole tools without removing the sensor apparatus from the downhole tools. Not removing the sensor apparatus may enable the data stored in the sensor apparatus to be accessed faster, which may increase productivity of a wellbore and/or reduce the number of materials and man-hours associated with the wellbore.

Furthermore, being able to access data without removing the sensor structures may reduce expenses on the wellsite associated with safety and hazardous waste disposal that may result from the use of lithium batteries to energize the sensor apparatus. Embodiments herein may also reduce the risk of damaging the sensor structure during disassembly and reassembly.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A downhole sensor apparatus, comprising:
- a sensor structure comprising:
  - an annular ring including a first surface defining a first end of the downhole sensor apparatus and a second surface opposite the first surface, the annular ring configured to be inserted into a recess of a drill string component with the first surface adjacent an interior surface of the drill string component within the recess; and
  - a sensor positioned within the annular ring;
- a cap configured to be received at least partially in the recess adjacent to the sensor structure, the cap comprising:
  - a body including a base surface configured to contact the second surface, and an exterior surface defining a second end of the downhole sensor apparatus, the second end opposite and distal to the first end; and
  - a ridge extending radially outward from the body between the base surface and the exterior surface, the ridge configured to be received in the recess of the drill string; and
- a locking ring configured to be received around the body adjacent to the ridge, the locking ring configured to prevent the ridge from exiting the recess while allowing the cap to move relative to the locking ring and the drill string component for the cap to receive external pressure at the exterior surface and transfer a force resulting from the external pressure to the annular ring.

2. The downhole sensor apparatus of claim 1, wherein an area of the exterior surface is at least about 20% larger than an area of the first surface.

3. The downhole sensor apparatus of claim 1, wherein a ratio of an area of the exterior surface of the downhole sensor apparatus to the contact area of the interface is within a range of from about 2:1 to about 50:1.

4. The downhole sensor apparatus of claim 1, wherein the exterior surface of the cap is configured to receive external pressure that results in the force that transfers through the cap to another interface defined by contact area between at least a portion of the base surface of the cap and at least a portion of the second surface of the sensor structure.

5. The downhole sensor apparatus of claim 4, wherein one of the second surface of the sensor structure and the base surface of the cap comprises an annular surface such that the another interface is defined by a contact area between the annular surface and at least a portion of the other of the second surface of the sensor structure and the base surface of the cap.

6. The downhole sensor apparatus of claim 1, wherein the first surface of the sensor structure is substantially the same size as the second surface of the sensor structure.

7. The downhole sensor apparatus of claim 1, wherein a cross-sectional thickness of the sensor structure is substantially uniform along a height of the sensor structure defined by a distance from the first surface to the second surface.

8. The downhole sensor apparatus of claim 1, wherein the base surface of the cap is smaller than the exterior surface of the cap and larger than the first surface of the sensor structure.

9. The downhole sensor apparatus of claim 1, wherein the locking ring includes threads configured to secure the locking ring to respective threads of the recess in a position configured to prevent the ridge from exiting the recess while allowing the cap to move relative to the locking ring and the drill string component for the cap to receive external pressure at the exterior surface and transfer a force resulting from the external pressure to the annular ring.

10. The downhole sensor apparatus of claim 1, wherein the sensor is positioned on an inner radial surface of the annular ring.

11. The downhole sensor apparatus of claim 1, wherein the sensor structure includes a sensor board positioned within the annular ring and the sensor is secured to the sensor board.

12. A drill string component, comprising:
- a downhole tool comprising a recess formed therein and defining an interior surface at an end of the recess;
- a sensor structure comprising:
  - an annular ring including a first surface and a second surface opposite the first surface, the sensor structure positioned within the recess with at least a portion of the first surface contacting at least a portion of the interior surface of the downhole tool; and
  - a sensor positioned within the annular ring, the sensor configured to measure a force applied to the annular ring; and
- a cap at least partially received in the recess adjacent to the sensor structure, the cap comprising:
  - a body including a base surface positioned within the recess adjacent to and contacting the second surface of the annular ring, and an exterior surface exhibiting an exterior surface area distal to the first surface of the annular ring; and
  - a ridge extending radially outward from the body between the base surface and the exterior surface, the ridge received in the recess of the drill string; and
- a locking ring received around the body adjacent to the ridge, the locking ring positioned to prevent the ridge from exiting the recess while allowing the cap to move relative to the locking ring and the drill string component for the cap to receive external pressure at the exterior surface and transfer a force resulting from the external pressure to an interface defined by a contact area between the first surface of the annular ring and the interior surface of the downhole tool.

13. The drill string component of claim 12, further comprising a strain gage positioned within the annular ring and configured to measure one or more mechanical properties of the downhole tool.

14. The drill string component of claim 12, wherein the downhole tool comprises a first alignment feature formed in a sidewall of the recess, and wherein the sensor structure comprises a second alignment feature formed in an outer radial surface of the annular ring and configured to engage the first alignment feature to secure the sensor structure in a specific orientation relative to the downhole tool.

15. The drill string component of claim 14, wherein the cap includes an alignment recess formed in the body at the base, the alignment recess receiving a portion of at least one feature chosen from among the first alignment feature and the second alignment feature therein to position the cap relative to the sensor structure.

16. The drill string component of claim 12, wherein the exterior surface of the cap is configured to receive external pressure that transfers through the cap, through another interface defined by another contact area between at least a portion of the second surface of the annular ring and at least a portion of the base surface of the cap, and through the annular ring to the interface.

17. The drill string component of claim 12, wherein the sensor is positioned on an inner radial surface of the annular ring.

18. A method of operating a sensor apparatus for a downhole tool, the method comprising:

receiving, at an exterior surface of a cap of the sensor apparatus, external pressure resulting in a force that transfers to a sensor structure of the sensor apparatus within a recess formed in the downhole tool to allow a sensor of the sensor apparatus to detect at least one drilling parameter acting on the downhole tool, the cap at least partially in the recess adjacent to the sensor structure, the sensor apparatus comprising:

the sensor structure comprising:

an annular ring including a first surface defining a first end of the downhole sensor apparatus and a second surface opposite the first surface, the annular ring inserted into the recess with the first surface adjacent an interior surface of the downhole tool within the recess; and the sensor positioned within the annular ring;

the cap at least partially received in the recess adjacent to the sensor structure, the cap comprising:

a body including a base surface positioned within the recess adjacent to and contacting the second surface of the annular ring, and an exterior surface exhibiting an exterior surface area distal to the first surface of the annular ring; and a ridge extending radially outward from the body between the base surface and the exterior surface, the ridge received in the recess of a drill string; and a locking ring received around the body adjacent to the ridge, the locking ring positioned to prevent the ridge from exiting the recess while allowing the cap to move relative to the locking ring and the drill string component for the cap to receive the force and transfer the force to the sensor structure; and detecting, via the sensor, the at least one drilling parameter selected from a torsional force about a central longitudinal axis of the downhole tool and a compressive force along the central longitudinal axis of the downhole tool.

19. The method of claim 18, wherein receiving the external force that secures the sensor apparatus within the recess of the downhole tool comprises receiving, on the exterior surface of the cap of the sensor apparatus, downhole drilling fluid pressure applied by drilling fluid circulating through a wellbore.

20. The method of claim 18, further comprising storing the at least one drilling parameter at periodic time intervals.

* * * * *